United States Patent [19]

George et al.

[11] Patent Number: 5,133,050
[45] Date of Patent: Jul. 21, 1992

[54] TELESCOPE OPERATING SYSTEM

[75] Inventors: Douglas B. George, Kanata; L. Robert Morris, Nepean, both of Canada

[73] Assignee: Carleton University, Ottawa, Canada

[21] Appl. No.: 501,247

[22] Filed: Mar. 29, 1990

Related U.S. Application Data

[63] Continuation-in-part of Ser. No. 261,256, Oct. 24, 1988, abandoned.

[51] Int. Cl.[5] ............................................. G06F 15/20
[52] U.S. Cl. .................................. 395/135; 340/705; 395/140
[58] Field of Search ............... 340/705, 724, 725, 726, 340/727; 364/516, 521, 559

[56] References Cited

U.S. PATENT DOCUMENTS

| | | | |
|---|---|---|---|
| 3,578,975 | 5/1971 | Wheeler | 250/201.2 |
| 3,609,374 | 9/1971 | Gevas | 250/203 R |
| 3,626,192 | 12/1971 | Held | 250/203 R |
| 3,932,861 | 1/1976 | Bull | 340/980 |
| 4,028,725 | 6/1977 | Lewis | 340/980 X |
| 4,187,422 | 2/1980 | Zoltan | 250/203 R |
| 4,446,480 | 5/1984 | Breglia et al. | 364/559 X |
| 4,484,192 | 11/1984 | Seitz et al. | 364/449 X |
| 4,544,243 | 10/1985 | Munnerlyn | 340/705 X |
| 4,560,233 | 12/1985 | Banbury | 340/705 X |
| 4,567,478 | 1/1986 | Schwab | 340/705 |
| 4,711,512 | 12/1987 | Upatnieks | 350/3.7 |
| 4,764,881 | 8/1988 | Gagnon | 364/516 X |

Primary Examiner—Parshotam S. Lall
Assistant Examiner—Edward R. Cosimano
Attorney, Agent, or Firm—Perkins, Smith & Cohen

[57] ABSTRACT

A method of operating a telescope is provided herein for a telescope having an eyepiece. The method uses a graphics display having a data base of celestial bodies, and means for generating and displaying a graphics display comprising graphics artefacts, each representing an associated celestial body. The method includes the first step of correlating, as a datum, the position of that telescope and the position of that graphics display corresponding to the field of view of the telescope. The second step involves displacing that graphics display or the position of the telescope to show an artefact representing a celestial body of interest. The third step involves detecting the effective distance moved in such displacing step. The final step involves either moving the telescope a corresponding distance, or changing that graphics display effectively to track movement of the telescope, respectively, such that the celestial body of interest is visible in the telescope eyepiece, and a corresponding graphics artifact is visible in that graphics display. Further in a preferred embodiment, that graphics display is superimposed on the telescope image in the eyepiece such that the graphics artifact is aligned with the celestial body of interest.

87 Claims, 13 Drawing Sheets

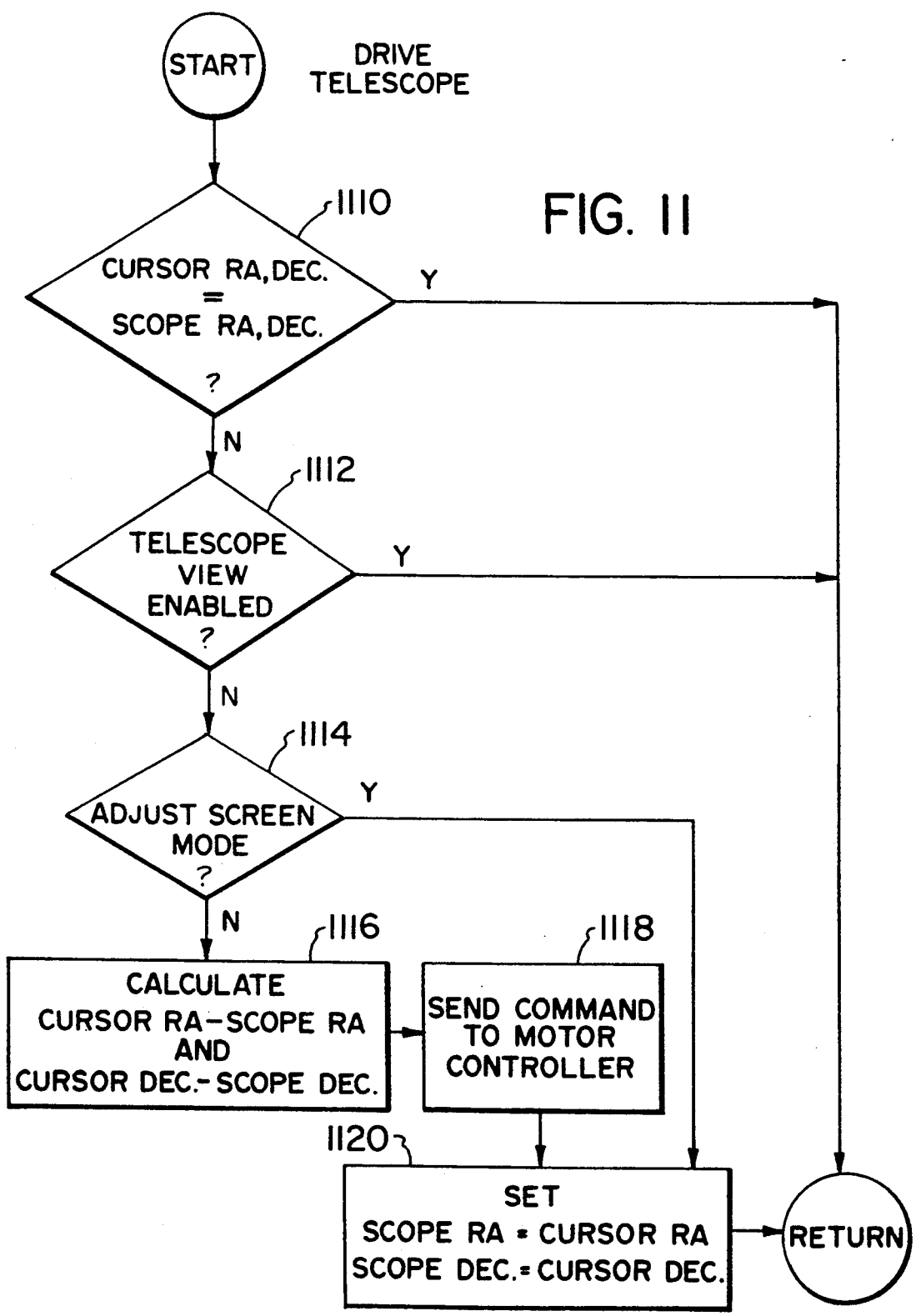

TELESCOPE OPERATING SYSTEM

RELATED INVENTIONS

This application is a continuation-in-part of co-pending application Ser. No. 261,256 filed Oct. 24, 1988, the entire contents of which are herein incorporated by reference now abandoned.

BACKGROUND OF THE INVENTION

(i) FIELD OF THE INVENTION

This invention relates to a telescope operating system capable of assisting an observer to locate stars or other celestial bodies. The invention specifically concerns an apparatus and method for operating an optical telescope, and an optical assembly for use with such an operating system.

(ii) DESCRIPTION OF THE PRIOR ART

As is known, most astronomical telescopes comprise two main parts: the optics and the mounting. The optics on modern telescopes generally consist of extremely accurate mirrors. Light reflected from the mirrors is brought to a focus outside the instrument, where an eyepiece, camera, or other instrument may be mounted. Focusing is done by varying the distance between the primary mirror and the eyepiece.

The mounting of the telescope may be in one of several configurations. Most telescope designs utilize some variation of the Equatorial mounting. Such mountings have a Polar or Right Ascension axis carefully aligned to be parallel with the poles of the earth, and a perpendicular Declination axis. The terms Right Ascension and Declination refer to the equivalents of Longitude and Latitude in the celestial coordinate system. The position of the telescope can be determined directly by measuring the angular position of the telescope axes. Declination is usually measured in hours, minutes, and seconds of the Vernal Equinox. The Vernal Equinox is the prime meridian for the celestial coordinate system, corresponding to the direction of the sun at the spring equinox. The position of the telescope will usually be adjustable by means of motors, one for each axis.

One conventional method of locating a celestial body was to use a paper star chart or catalog, and manually to adjust the telescope using either setting circles or using a wider-field finder telescope. An improvement on this method was the Planisphere which operated as a small, flat planetarium, allowing the user to rotate the chart through a window to see the sky as it appeared at a particular latitude at any date and time. Another improvement was the use of a computer program to plot the star maps. In large observatories, sophisticated control systems, with micro-controllers used in conjunction with star and celestial body data bases allowed the user to enter coordinates or a designation of the celestial body, and the telescope would automatically slew to the desired location. These systems tend to be expensive and so not generally applicable to smaller telescopes.

The patent literature has also disclosed some improvements in star tracking.

U.S. Pat. No. 3,578,975 patented May 18, 1971 by The Perkin-Elmer Corporation provided a telescope guiding and focusing apparatus in which guiding and focusing errors in a stellar telescope were detected automatically using photo-electric techniques. Light from a guide star, collected by a telescope, was directed out of the telescope as a converging focusable beam and impinged on a high-speed chopping element. Guiding errors were detected by measuring the intensity of the emerging chopped light. An AC component in the output signal indicated a guiding error. Focusing errors were detected by measuring the intensity of the emerging chopped light after it struck and was partly blocked by a knife edge positioned where the focus should occur. An AC component in the output signal indicated a focusing error. Both output signals were either read on meters, or were fed into servosystems which moved portions of the telescope to compensate for the errors.

U.S. Pat. No. 3,609,374 patented Sep. 28, 1971 by Singer-General Precision provided a star tracking system including detectors arranged in a linear array perpendicular to the scanning path to sample the field of view, either mechanically or electrically until a presumed star signal was detected. At that time, the array or its image retrogressed a short distance and re-scanned only a very small segment of the field of view several times. If the signal actually was a star signal, it would be detected at the conclusion of the re-scanning. If it were not, the search would continue until the star was acquired. Using such scanning technique, the signal-to-noise threshold was set comparatively low, for example, at one-half the signal-to-noise ratio ordinarily used, thereby greatly increasing the background brightness capability. The system was arranged both to raise the threshold to a relatively high signal-to-noise ratio and to change the matched-filter-bandwidth, when the scanner retraced to make its subsequent passes. This was thus a device used for tracking the position of a star using a small telescope.

U.S. Pat. No. 3,626,192 patented Dec. 7, 1971 by The Bendix Corporation provided a star tracker having an aperture for receiving and diffracting starlight and daylight. Interference fringes were formed from the starlight because of its coherent nature. A phase shifter was positioned to intercept a portion of the diffracted light and to phase shift the intercepted light in response to a signal causing the interference fringes to be modulated in accordance with the signal. Photodetectors sensed the fringe modulation and provide modulated outputs which were then demodulated to provide DC voltages corresponding to the intensity of the detected interference fringes. The DC voltages were subtracted and the remainder was used to energize a servo motor to aim the star tracker at a star.

U.S. Pat. No. 4,187,422 patented Feb. 8, 1980 by the Singer Company provided a self-calibrating star tracker in which a light signal source located on the detector was reflected into the optics and was redirected from the optics back onto the detector. In this manner, movement of the detector or optics from a known position could be sensed and calibration of the instrument could be conducted at any time. Such star tracker was proposed to be used with an inertial guidance system which included both a detector and optics.

SUMMARY OF THE INVENTION

AIMS OF THE INVENTION

Nevertheless, in spite of all the art discussed above there is still a need for, and an object of the present invention is to provide, a relatively inexpensive telescope system which assists the observer in performing the basic function of the location and identification of stars and other objects.

Another object of this invention is to provide such a system which is flexible in order to enable a variety of types of operation to be performed with one instrument.

STATEMENTS OF INVENTION

According to a first aspect of this invention a method of operating a telescope having an eyepiece, with the aid of a graphics system having a data base graphics display comprising graphics aretefacts, each representing an associated celestial body. The method comprises the steps of: correlating, as a datum, the position of the telescope with the position of the graphics display corresponding to the field of view of the telescope; displacing the graphics display to show a target graphics artefact representing a celestial body of interest; detecting the effective distance moved in displacing the graphics display; and moving the telescope a corresponding distance, such that an image of the celestial body of interest is visible in the eyepiece of the telescope and the target graphics artefact is visible in the graphics display.

According to a second aspect, the invention also comprises a method of operating a telescope having an eyepiece, with the aid of a graphics system having a data base of celestial bodies, and means for generating and displaying a graphics display comprising graphics artefacts, each representing an associated celestial body. The method comprises the steps of: correlating, as a datum, the position of the telescope with the position of the graphics display corresponding to the field of view of the telescope; displacing the telescope until a celestial body of interest is in the field of view of the telescope; detecting the effective distance moved in displacing the telescope; and displacing the graphics display effectively to track the movement of the telescope such that an image of the celestial body of interest is visible in the eyepiece of the telescope and a target graphics artefact representing the celestial body of interest is visible in the graphics display.

According to a third aspect, the invention comprises apparatus for operating a telescope, having an eyepiece, comprising: a data base of celestial bodies; means for correlating, as a datum, the position of the telescope with the position of a selected graphics display corresponding to the field of view of the telescope; means for displacing the selected graphics display to show a target graphics artefact representing a celestial body of interest; means for detecting the effective distance moved in displacing the selected graphics display; and means for moving the telescope a corresponding distance, such that an image of the celestial body of interest is visible in the telescope eyepiece, and the target graphics artefact is visible in the selected graphics display.

According to a fourth aspect, this invention comprises apparatus for operating a telescope having an eyepiece, comprising: a data base of celestial bodies; means for generating and displaying a graphics display comprising graphics artefacts, each representing an associated celestial body; means for correlating, as a datum, the position of the telescope with the position of the graphics display the graphics display corresponding to the field of view of the telescope; means for displacing the telescope until a celestial body of interest is in the field of view of the telescope; means for detecting the effective distance moved in the displacing of the telescope; and means for displacing the graphics display effectively to track the movement of the telescope, such that an image of the celestial body of interest is visible in the eyepiece of the telescope, and a target graphics artefact representing the celestial body of interest is visible in the graphics display.

OTHER FEATURES OF THE INVENTION

An advantage of the method of a first aspect of the invention is that the telescope itself does not need to be moved until the celestial body of interest, for example a star, has been identified. With a conventional telescope, in the absence of expensive automatic tracking systems, the operator will usually move the telescope in a somewhat meandering path as he picks the star out from among its neighbours and brings the telescope to bear upon the target. Moreover, since the telescope has a narrow field of view, comparison with a separate conventional star chart can make the sighting process very slow and difficult. Substituting a graphics display for the optical image during initial sighting, and effectively decoupling the telescope drive until an initial sighting has been made upon the graphics artefact, enables embodiments of the invention to speed up the sighting process. Since the identification can be made with the graphics display set to a wider angle of view than that of the telescope, the observer can receive more information.

Thus the graphics display may comprise additional artefacts representing celestial bodies in the vicinity of the celestial body of interest. In fact, in preferred embodiments the graphics display comprises a star map, the artefacts representing stars and other celestial bodies. Each artefact may comprise a single picture element and be of variable intensity according to the magnitude of the star or other celestial body it represents. Such a star map will appear very similar to the real night sky as viewed through the telescope. This makes it easier to locate and accurately sight upon the celestial body of interest.

The step of displaying the graphics display may comprise an initial sighting, and may be followed by a second step in which a more accurate sighting is made, the "magnification" or viewing angle of the graphics display being increased for the second step, preferably so that the graphics display magnification corresponds to that of the eyepiece ("Telescope View"). Selection of the "Drive Mode" for the telescope may take place as soon as the initial sighting has been made and conveniently may be initiated at the same time as, and indeed by, the change in magnification. This change may be effected manually by the operator.

During the final part of the sighting process, the star field viewed by the telescope will be substantially the same as that displayed graphically, whereupon the final sighting may be done by superimposing the graphics artefact and the image of the celestial body of interest.

When the graphics artefact and the optical image of the celestial body of interest are nearly superimposed, the graphics artefact may be converted into a cross-wire or other sighting device. An advantage of this arrangement is that it facilitates accurate positioning of the optical image and artefact relative to each other. The change to cross-wires may be made at the same time that "Telescope View" is selected and the telescope drive enabled. In both embodiments of the method of this invention, the reference graphics artefact may be coupled to the step of selecting a predetermined viewing angle for the graphics display that corresponds to that of the telescope.

Small adjustments may be made when the telescope is in the "Drive Mode", permitting small corrections to the positioning of the graphics display, and hence to the final position of the telescope.

The method of the second aspect of the invention is especially advantageous for giving instruction or demonstrations. The instructor can operate the telescope manually and the students/observers can watch the graphics display on a separate monitor. Moreover, a student could practise indoors with the graphics display simulating the telescope view.

The apparatus of the third aspect of the invention may include means for superimposing the graphics display of the celestial body on the optical image in the eyepiece, i.e. it displays the graphics display image upon the field of view of the telescope. The apparatus may comprise user-operable input means for inputting data for a celestial body of interest, means for selecting, from the data base, data for generating an artefact representing the celestial body of interest; and means for displaying the artefact in a corresponding graphics display superimposed upon the field of view of the telescope.

In preferred embodiments, the apparatus further includes means for switching between a first magnification for an initial positioning of the artefact, and a second magnification for alignment of the artefact and said optical image of the celestial body, and means responsive to the switching means for enabling the driving of the telescope.

Graphics artefacts in the actual graphics display may take a variety of forms other than star maps. For example, they may comprise information on the celestial bodies being observed; or data on the telescope position, operating status and time; or may show data identifying and describing stars or other astronomical objects in the field; or show a special cross-bar, to measure celestial bodies with readout of relative positions; or show a moving cross-bar reticular superimposed as a slow moving image to aid in photographing comets or other slowly-moving celestial bodies; or show timing information for recording occultations or other events.

In preferred embodiments of the invention, the graphics display is superimposed upon the field of view of the telescope within the eyepiece. Hence yet another aspect of this invention comprises an optical assembly for use with a telescope having an operating system comprising a graphics display generator, the optical assembly comprising a beam splitter, a video display unit positioned so as to direct light onto the beam splitter, and an eyepiece for viewing light from the beam splitter such that the display from the video display unit is superimposed upon the optical image in the telescope eyepiece.

Preferably the beam splitter is a plate, for example a glass plate, which transmits more than it reflects. The video display unit may then be positioned so that the graphics images are reflected by the plate towards the eyepiece, the light from the telescope being transmitted through the plate to the eyepiece. This compensates for the much higher intensity of the graphics image as compared with the optical images through the telescope.

The video display unit may be a cathode ray tube.

A diaphragm and lens may be interposed between the video display unit and the glass plate. A removable coloured filter may be interposed between either the telescope and the beam splitter, or the video display unit and the beam splitter, to assist the observer in differentiating between the optical image and the graphics display. Preferably, the filter is interposed between the video display unit and the beam splitter since the graphics display will usually be brighter than the optical image.

BRIEF DESCRIPTION OF THE DRAWINGS

Embodiments of the invention will now be described, by way of example, with reference to the accompanying drawings, in which:

FIG. 11 is a flowchart for the "Drive Telescope" function of FIG. 10;

DETAILED DESCRIPTION OF A PREFERRED EMBODIMENT

Figure 1:
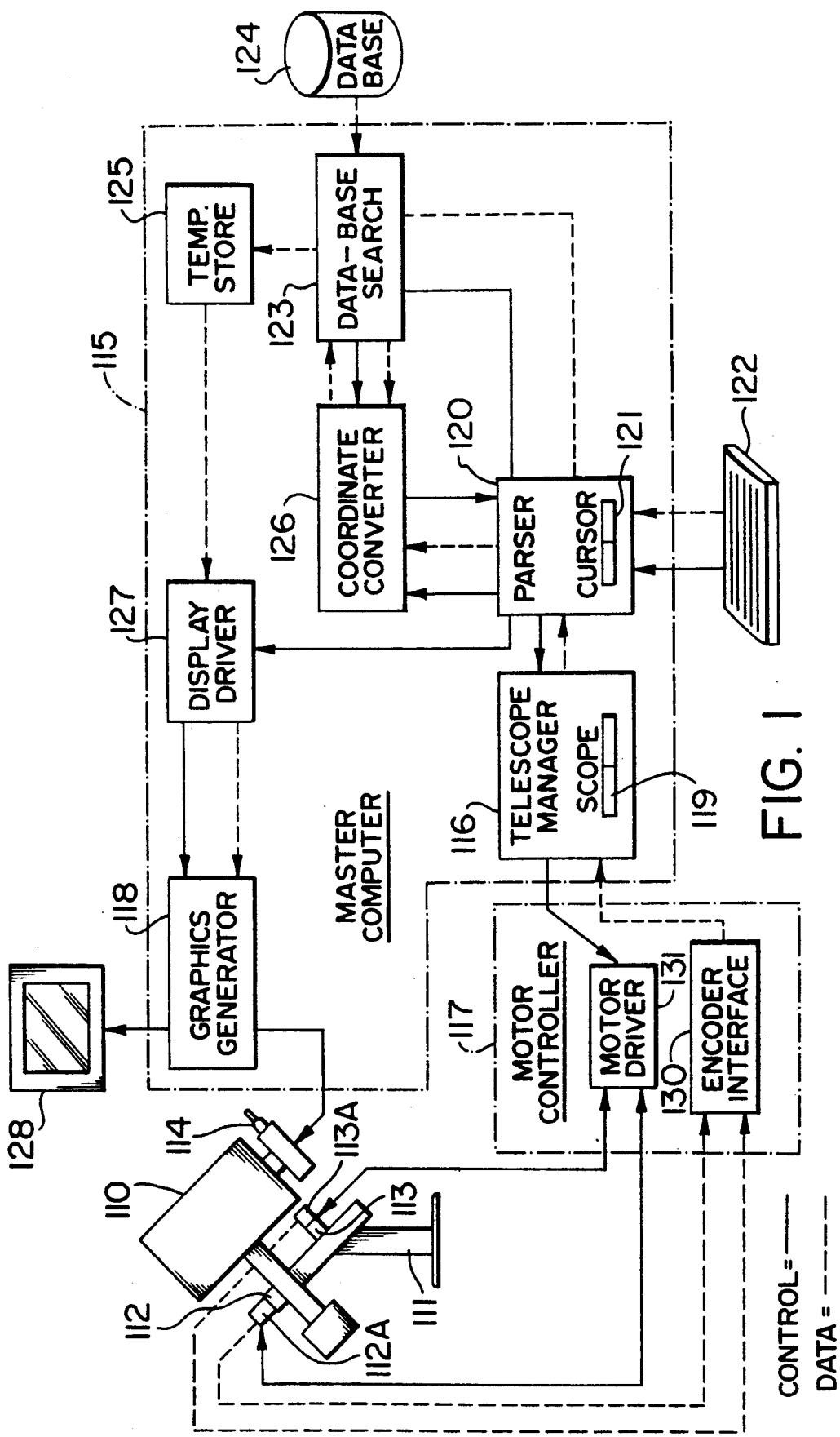
FIG. 1 is a schematic representation of the major components of a telescope and its operating system.

DESCRIPTION OF FIG. 1 shown in FIG. 1, a telescope 110 is mounted on a suitable mounting 111, driven by motors 112 and 113, for Declination and Right Ascension, respectively. One suitable telescope is that known by the trade mark "Super-Polaris Celestron-8" which includes stepper-motor drive. The telescope is equatorially mounted. This is done so that the telescope can be rotated slowly to counteract the Earth's motion. This also makes the measurement of the celestial coordinates of a celestial body much easier. The optical system of this embodiment of the telescope is a Schmidt-Casegrain. The diameter of the objective is 200 mm. In this type of telescope, focusing is achieved by moving the primary mirror instead of the eyepiece. Since it is not necessary for the viewing apparatus to move, a very stable support is possible for the optical assembly.

Figure 12:
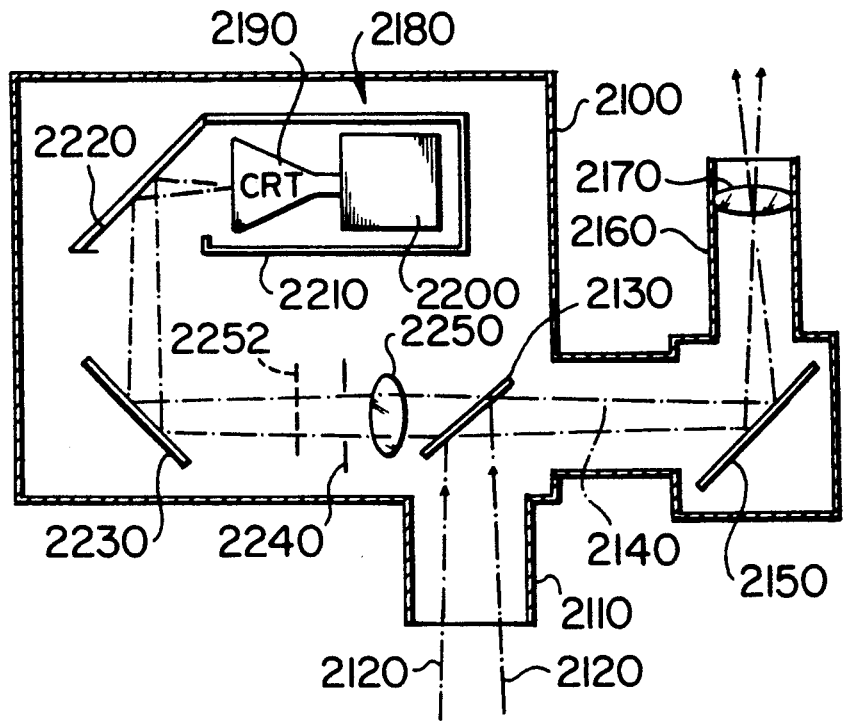
FIG. 12 is a schematic longitudinal section through an embodiment of the invention comprising a telescope optical assembly.

The telescope 110 is fitted with an optical assembly or eyepiece 114, which superimposes computer-generated high resolution graphics information, from graphics generator 118, (an ATI EGA "Wonder" card or the equivalent) onto optical images in the eyepiece 114 of the telescope 110. This is done by combining two light paths using a beam-splitter (as shown in FIG. 12). Thus, the graphics images will be displayed on an external monitor 128 and, simultaneously, within the eyepiece 114 where the graphics image will be inserted into the optical path for viewing by the operator. The components of the optical assembly 114 will be described in detail later, with reference to FIG. 12.

A master computer represented by block 115, an IBM-PC or equivalent using an Intel 8088 processor and 8087 math coprocessor or equivalent, programmed as will be described hereinafter, is represented as having, in addition to graphics generator 118, a Telescope Manager 116 which is coupled to a motor controller 117, which, in turn, controls stepper motors 112 and 113.

The Telescope Manager 116 comprises a memory location 119, in effect like a pair of registers, one for storing Right Ascension "distance-to-go" and the other for storing Declination "distance-to-go". Memory location 119 will be referred to, for convenience as "Telescope Register" 119. The motor controller 117 comprises a motor driver 131 which moves the telescope 110 in dependence upon the contents of the "Telescope Register" 119 using the two stepper motors 112, 113, one on each axis of the instrument. This comprises "open-loop" control, wherein the stepper motor steps are determined by counting the pulses applied to them.

An alternative, "closed-loop" configuration is also illustrated in FIG. 1, wherein motor controller 117 comprises also an encoder interface 130 which monitors the telescope position by means of shaft encoders 112A and 113A, respectively. The shaft encoders 112A, 113A, which detect movement of the telescope 110, are incorporated into the stepper motor assemblies, 112, 113.

The contents of the "Telescope Register" 119 can be changed by a parser 120, which has a corresponding memory location 121 (referred to hereafter as the "Cursor Register"), which controls the position of a cursor which is the centre of the graphics display.

The master computer 115 also has a data base search interface 123, controlled by parser 120, for accessing a data base 124 containing data on celestial bodies, specifically coordinates and magnitudes for generating star charts, which will be discussed at greater length later. Data retrieved by the data base search interface 123 is stored in Temporary Store 125. "Coordinate Conversion" means 126 serves to convert the star map coordinates (i.e., celestial coordinates), from the star catalog coordinates in data base 124, to take account of sidereal time and cursor position before such data is stored in "Temporary Store" 125, thereby to suit the graphics generator 118. A display driver 127, controlled by parser 120, passes the converted coordinates and magnitude information from the "Temporary Store" 125 to the "Graphics Generator" 118 for generating graphics artefacts representing celestial bodies, for Display; the graphics display preferably comprises a star map, the graphics artefacts representing stars or other celestial bodies. The master computer 115 is operated by a keyboard 122, the output of which is translated by the parser 120 and applied to the data base search means 123, the telescope manager 119 and/or the display driver 127.

The master computer 115 controls the entire system. By way of telescope manager interface 116 and motor controller 117, the master computer 115 controls the position of the telescope 110 and is able accurately to determine the position of the telescope 110.

In the alternative configuration of FIG. 1, in which the shaft encoders 112A, 113A are connected to the shaft encoder interface 130, the interface 130 transmits data to the telescope manager 116, so that, when the position of the telescope is changed, such movement is detected by the shaft encoders 112A, 113A and a corresponding signal is fed to the telescope manager 116 to increment or decrement the telescope register 119. Accordingly, the master computer 115 compares the contents of the telescope register 119 and cursor register 121 and displaces the graphics display effectively to track the movement of the telescope 110.

In one mode of operation, "Telescope View", in which the viewing angle of the graphics display corresponds to that of the telescope 110, which typically is the narrowest angle, the system is "enabled" for driving the telescope 110 physically to the coordinates that have been set. When "Telescope View" is selected, the difference between the Telescope Register 119 and Cursor Register 120 will be applied as an "error" signal to the motor controller 117 causing the telescope 110 to be driven to such a position that the telescope view will be the same as the graphics display.

In order that the movement of the telescope 110 will be correlated with the relative movement of the graphics display, the graphics system is aligned with the eyepiece 114 of the telescope 110 in an "Adjust Screen" mode when the viewing session commences. In the "Adjust Screen" mode, the drive to the telescope 110 is disabled. The graphics display, being referenced to the cursor 121, can be moved around by moving the cursor 121, and the telescope 110 will not move.

At the same time that "Adjust Screen" is selected the graphics artefacts change from single points (pels) to crosswires. This facilitates the alignment process since it is easier to center a point in a set of crosswires than to superimpose two substantially identical points of light.

Either the graphics display or the telescope can be moved, each independently of the other, using the cursor keys.

DESCRIPTION OF FIG. 2

Figure 2:
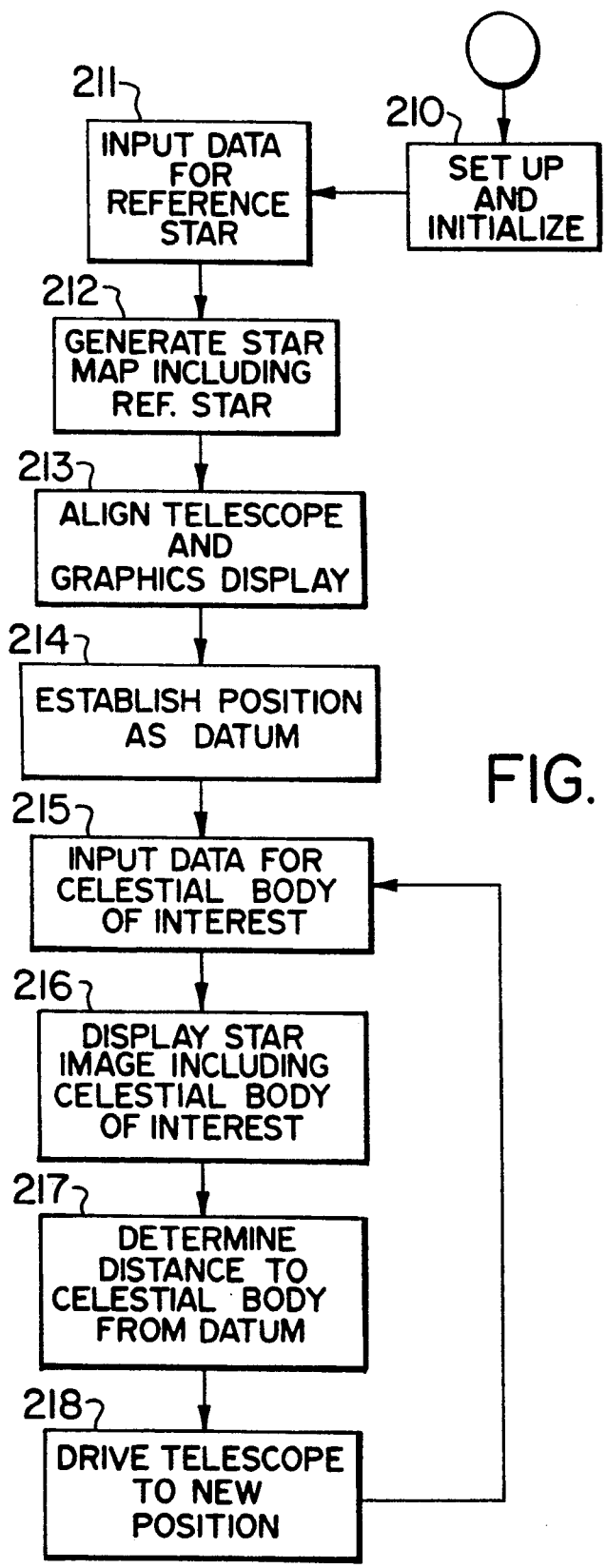
FIG. 2 is a flowchart depicting the sequence of operations in using the telescope to sight a star.

As shown in the flowchart in FIG. 2, when the system is first switched on, the first operation is to "Set-up and Initialize" (step 210) in which inter alia the telescope register 119 and cursor register 121 are set equal and variables adjusted in the coordinate converter 126.

The operator then selects "Adjust Screen", and adjusts the telescope 110 manually to center a known star to serve as a reference, or merely identifies a prominent star already visible in the eyepiece 114. The operator then loads the name of the star into the master computer 115 to call up and display the corresponding graphics artefact of the star (Steps 211, 212). The operator adjusts the graphics display so that the "Graphics" star artefact is superimposed upon the optical image of the real star (Step 213). Switching out of "Adjust Screen" mode, (Step 214) establishes that position as a datum. This constitutes alignment of the graphics display with the image in the eyepiece 114.

The telescope 110 can be moved to a new position by first adjusting the graphics display to its new location to sight a "target" celestial body of interest. The coordinates of the target celestial body are entered using keyboard 122 (step 215), the output of which is translated by the parser 120, which causes the data base search interface 123 to load star map data into temporary store 125. Following processing by coordinate converter 126, display driver 127 selects the appropriate segment of the star map and graphics generator 118 generates and displays it (Step 216) in the telescope eyepiece 114 and also on the external monitor 128. When the new coordinates are entered (as previously described, Step 215) the Cursor Register 121, but not the Telescope Register 119, will be incremented or decremented. Once the target star has been displayed on the monitor 128 and in the eyepiece assembly 114, the operator selects "Telescope View", (Step 216) whereupon the difference between the "Start" or "datum" position coordinates in the Telescope Register 119 and the coordinates in Cursor Register 121 is determined (Step 217) by parser 120 and the Telescope Manager 116 starts to drive the telescope towards the target object (Step 218). When the difference signal has been reduced to zero, the telescope stops moving. Once step 218 is completed, control passes back to step 215. During final adjustments, the operator may manipulate the telescope 110 using the cursor keys and the graphics display will track such movement.

The target celestial body could also be called up by entering its name only into the master computer 115. Its coordinates and magnitude could be extracted from the data base 124 together with data for celestial bodies in the surrounding field.

Data base search means 123 (FIG. 1) determines the portions of the data base 124 that will be used, and the degree of resolution that is necessary, in response to the parser 120 which translates the values selected by the operator. Hence, if a wide view is selected by the operator, it will take a portion of the data base 124 which has only a limited number of the brighter stars and will ignore the fainter stars (see FIG. 6). On the other hand, if a narrower view is selected, the parser 120 will select a portion of the data base which has the same number of stars but covering a smaller area. Hence the fainter stars also will be displayed.

Data base search means 123 transfers the data into the temporary store 125 from which the display driver 127 extracts the information for application to graphics display generator 118. The information which is stored in the data base 124 is in the form of star map Right Ascension and Declination information and needs to be converted into map coordinates. Accordingly coordinate conversion means 126 takes the star map data and converts it from spherical coordinates into x, y coordinates centred upon the cursor. In this form, the information can be used by the graphics card to generate the actual graphics display and the position of the cursor, and hence of the graphics display, can be manipulated, as mentioned previously, using the cursor keys of the keyboard via the Cursor Register 121.

In order to provide graphics artefacts of stars images to a sufficient level of detail, a number of data bases may be used. In the specific embodiment the following were used:

A public-domain data base of the brightest stars, called "STARS", containing about 1700 stars;

The Yale Bright Star Catalog (YBSC), listing approximately 4000 naked-eye visible stars;

The Smithsonian Astrophysical Observatory (SAO) catalog of 259,000 stars to 9th magnitude. Additional data bases could be added with little modification.

It was desirable to limit the number of stars in memory at any one time to about 2000, in order to assure real-time response. Thus, as previously mentioned, only the brighter stars were displayed on the wide-field views. In order to cover stars to the fainter magnitudes visible in telescopes, the SAO catalog was used.

As mentioned previously, the telescope drive, when enabled, was arranged to keep the contents of the Telescope Register 119 and Cursor Register 121 the same. Fine adjustment and centering of the star can continue while the telescope 110 is being driven. The telescope 110 will track any further adjustments resulting from differences between the contents of the registers.

DESCRIPTION OF FIGS. 3-9

Figure 3:
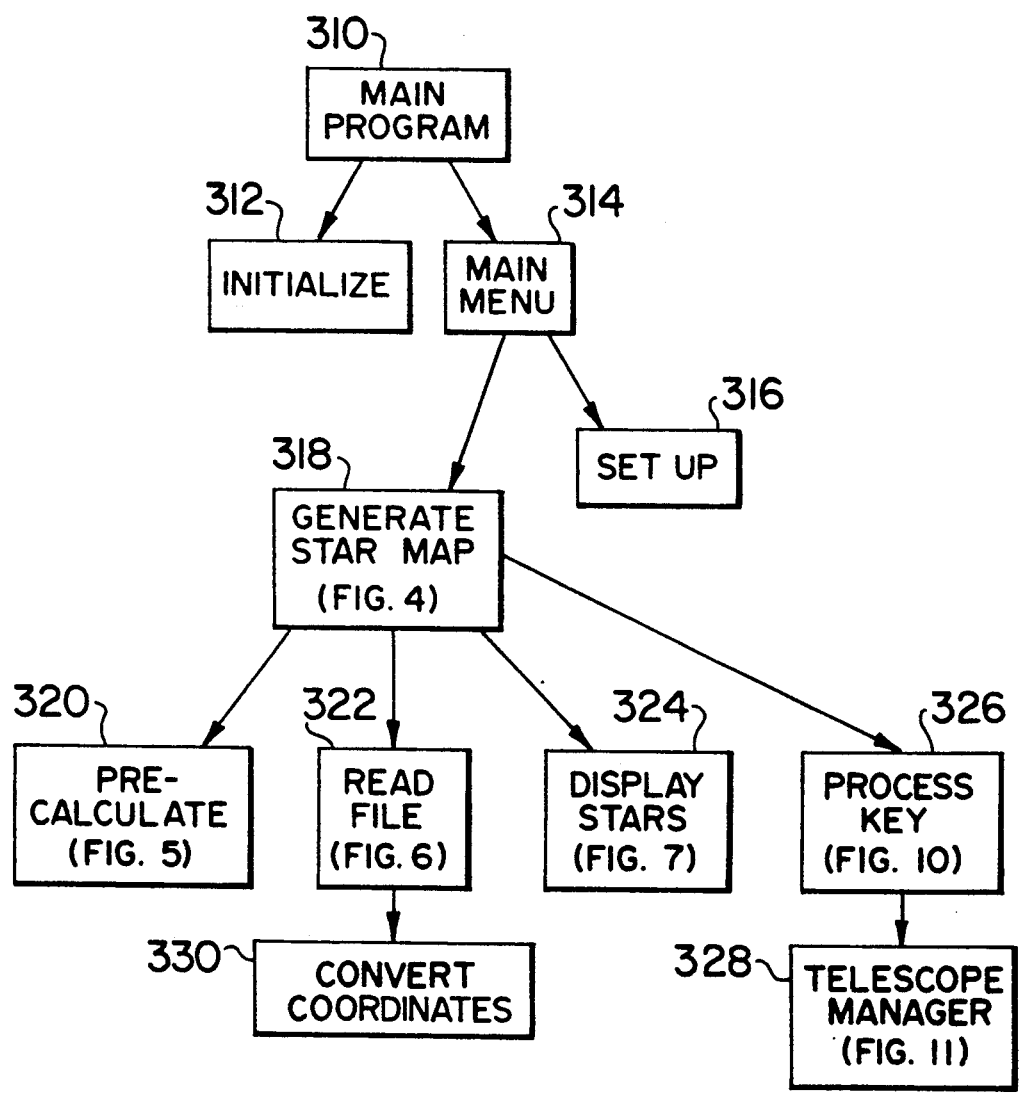
FIG. 3 is a program structure chart depicting the main components of the computer program which controls the operating system.

Operation of the master computer 115 is illustrated in the flowcharts, FIGS. 4 to 9, but first the overall program structure is shown in FIG. 3. The main program, 310, comprises an "Initialize" routine 312, which sets the Telescope Register 119 and Cursor Register 121, and sets variables for the Coordinate Conversion. A main menu 314 controls the initial set-up routine 316. The main menu 314 also supervises the "Generate Stars Map" subroutine 318, (shown in FIG. 4). The "Generate Star Map" subroutine 318 generates the graphics display and comprises a "Pre-Calculate" subroutine 320, (shown in FIG. 5) which calculates the coordinates of a selected star field and stores them, a "Read File" subroutine 322, (shown in FIG. 6) which extracts data from the data base 129, a "Display Stars" subroutine 324, (shown in FIG. 7) which displays the star map, and a "Process Key" subroutine 326, (shown in FIG. 10) which operates on data inputted via the keyboard 122. The "Read File" subroutine 322 utilizes the "Convert Coordinate" subroutine 330 to translate the coordinates read from the data base 129 for use by the "Display Stars" subroutine 324. A "Telescope Manager" subroutine 328, (shown in FIG. 11), interfaces the "Process Key" subroutine 326 to control the driving of the telescope 110.

Figure 10A:
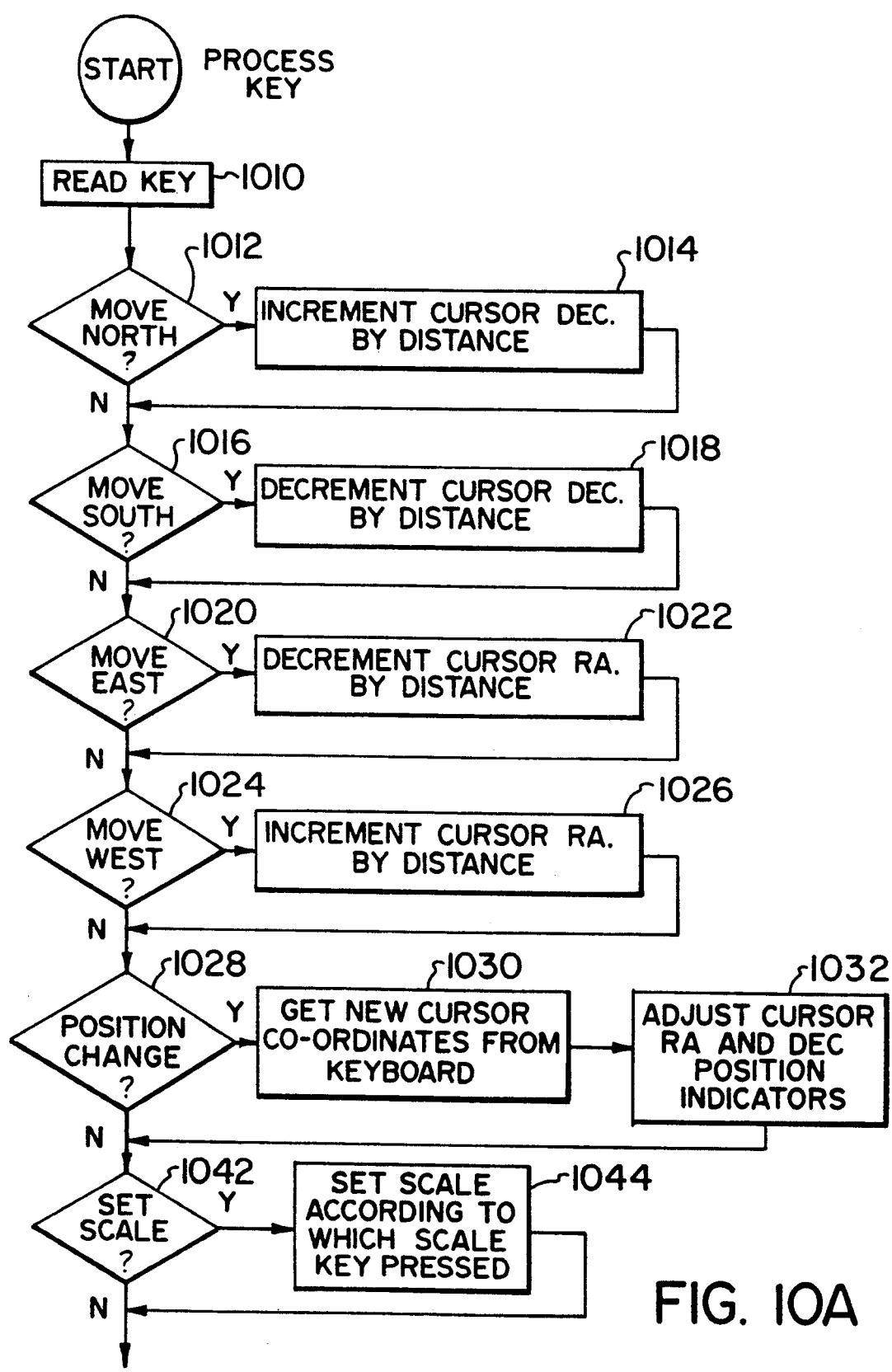
FIG. 10A, FIG. 10B and FIG. 10C collectively is a flowchart for the "Process Key" function of FIG. 4.
Figure 10B:
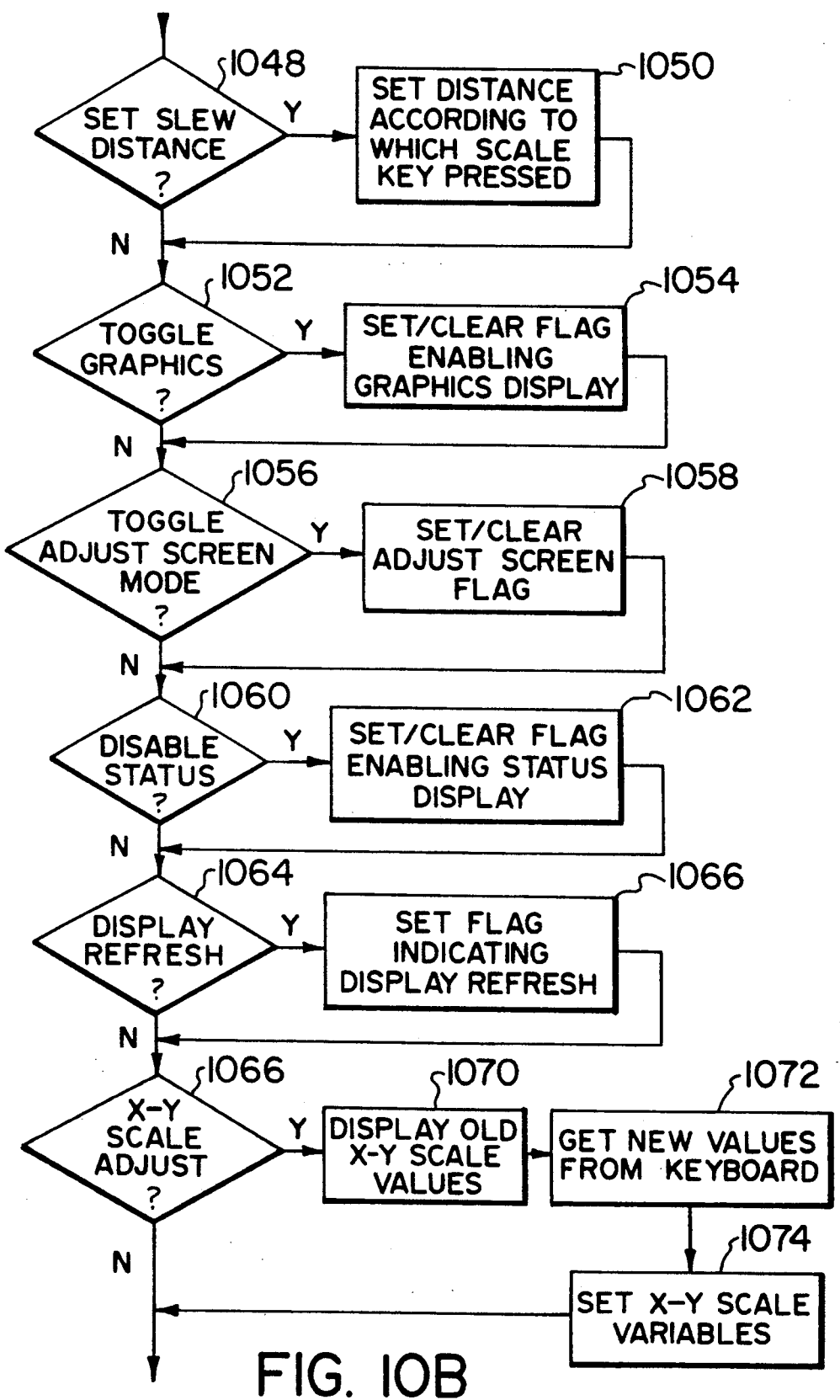
Figure 10C:
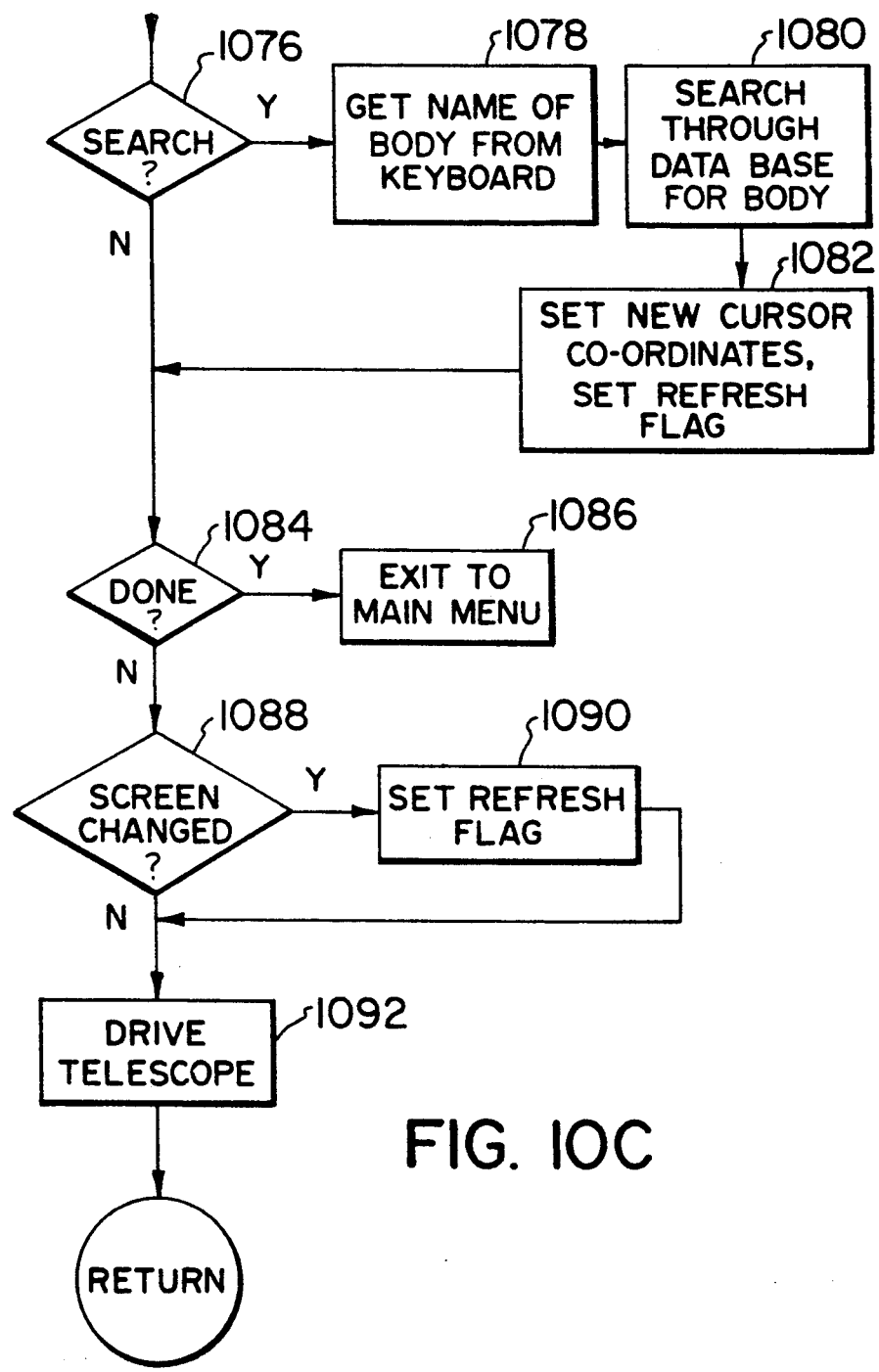

Referring now to the "Generate Star Map" subroutine in FIG. 4, the Wait For Key Pressed step (Step 410), detects when a key is pressed and "Process Key" step (Step 412) determines the action required as described in detail later with reference to FIG. 10.

Figures 4, 5:
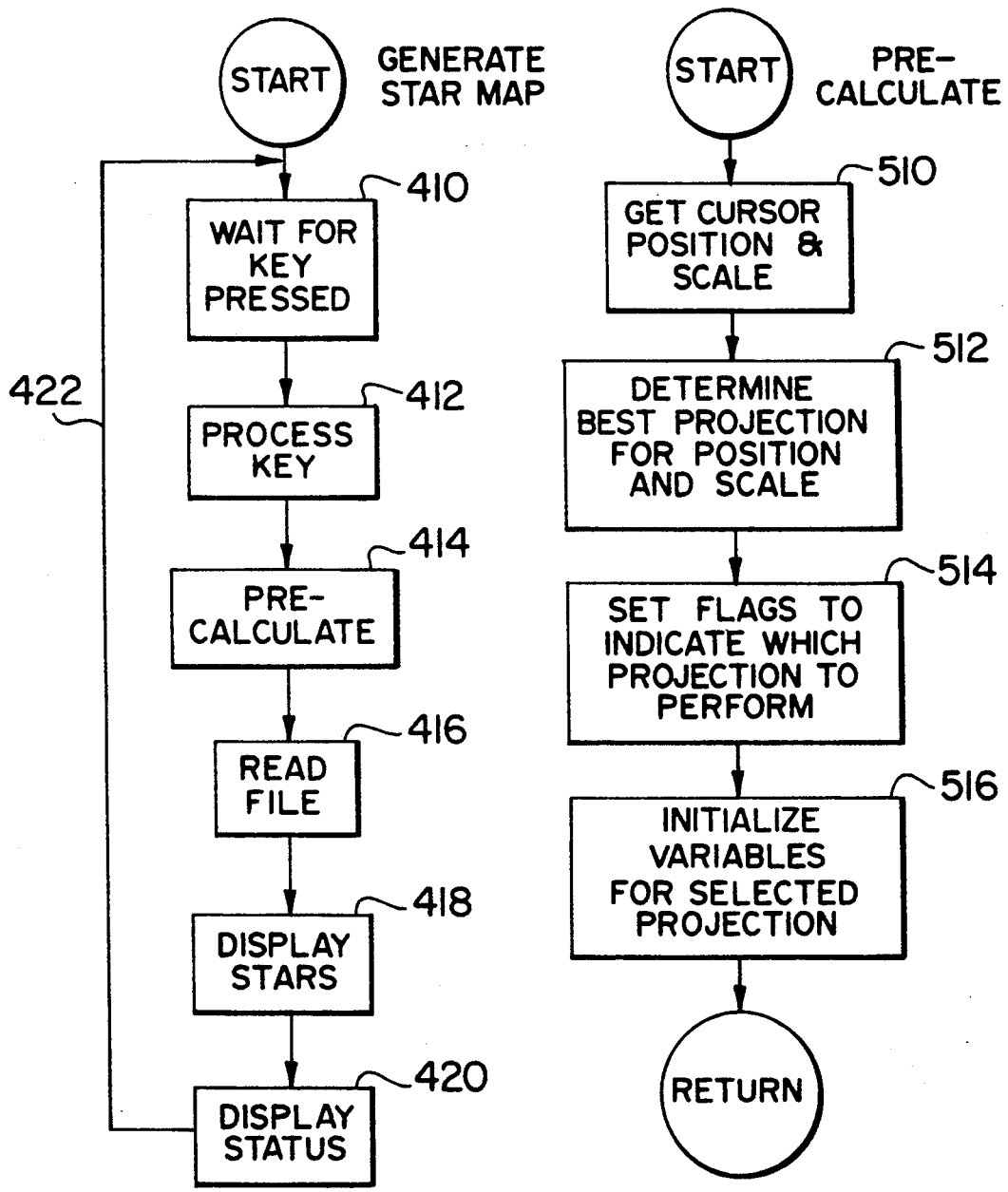
FIG. 4 is a flowchart depicting the "Generate Star Map Function" for generating and displaying a star map.
FIG. 5 is a flowchart for the "Precalculate" function of FIG. 4.

If the cursor is to move so as to take the graphics display beyond the limits of existing stored data, the coordinates will need to be calculated, so in the "Pre-Calculate" step (Step 414), the coordinate converter 126 sets the parameters and variables as detailed in FIG. 5. During the course of the next part of the sequence, the screen displays the word "calculating". The next processing step, "Read File" (Step 416), extracts the star map data from the data base 124 (FIG. 1), converts it and stores it in temporary store 125. "The Display Stars" step (Step 418), requires display driver 127 to take the star map data from the temporary store 125, determine from it the x-y coordinates for the stars referenced to the cursor's new position, for generating the graphics display with the various stars in their appropriate positions and with the appropriate intensities according to magnitude, and pass the data to graphics generator 118 for generation of the displays on the monitor 128 and in the eyepiece 114.

The "Display Status" step (Step 420) displays various things, for example the key that has been pressed, the mode being selected, RA and Declination, etc. For example, since the store 125 will hold data for generating approximately six times the area of sky that will actually be displayed on the screen, the "Display Status" step (Step 420) will indicate which portion is being displayed and the viewing angle represented.

Referring again to FIG. 4, a loop 422, from "Display Status" to the start, provides for successive user inputs.

The Pre-Calculate subroutine 414 is shown in more detail in FIG. 5. In the first step, "Get Cursor Position & Scale" (Step 510), the coordinate converter 126 gets the new cursor position and scale from the keyboard 122. In the next step "Determine Best Projection For Position And Scale" (Step 512), the best projection for position and scale is determined and stored in the coordinate converter 126. The next step "Set Flags To Indicate Which Projection To Perform" (Step 514) sets flags to indicate which projection is to be performed. In the next step "Initialize Variables For Selected Projection" (Step 516), the coordinate converter 126 initializes variables and parameters for subsequent map conversion. This "Precalculation" routine 414 saves duplicating computations for all of the stars extracted to generate the new star map. Naturally this would not be done if the cursor is moving within an area that will not cause the edge of the display to go beyond the data stored in the temporary store.

Figure 6:
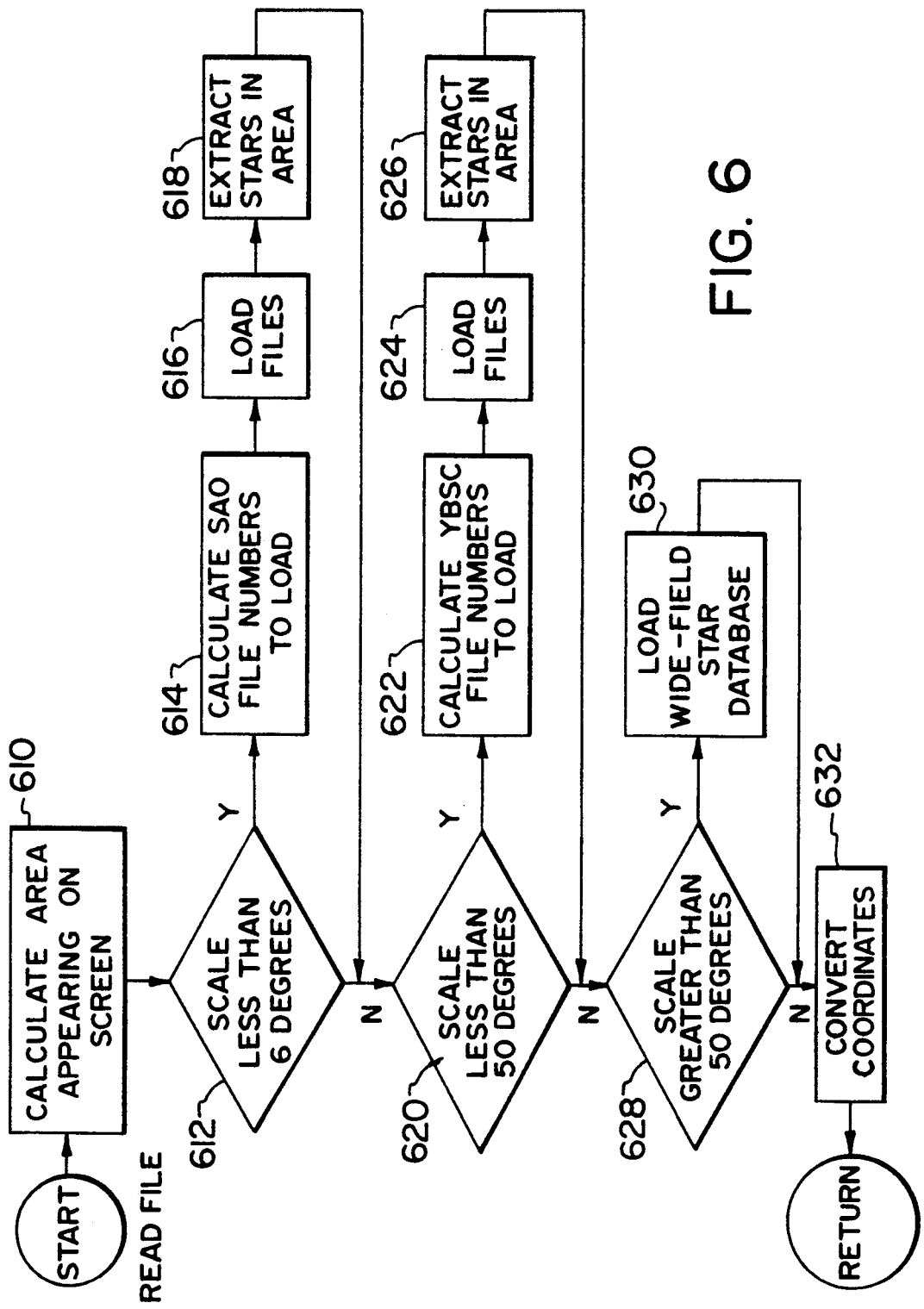
FIG. 6 is a flowchart for the "Read File" function of FIG. 4.

The "Read File" subroutine is shown in FIG. 6 and is performed by the data base search means 123. The first step, "Calculate Area Appearing On Screen" (Step 610), is to calculate the area appearing on the screen, which depends upon the field of view selected by the operator.

If the scale is less than six degrees, (decision Step 612), the Y decision is taken, and the SAO data base is used. The file numbers to be loaded are calculated, (Step 614), the files are loaded into store 125 (Step 616), and the chosen stars in the area are extracted (Step 618). After step 618 has been performed, or if the "N" decision is taken at step 612, step 620 is performed. If the scale is less than 50 degrees, then the YBSC database is selected.

Figure 8:
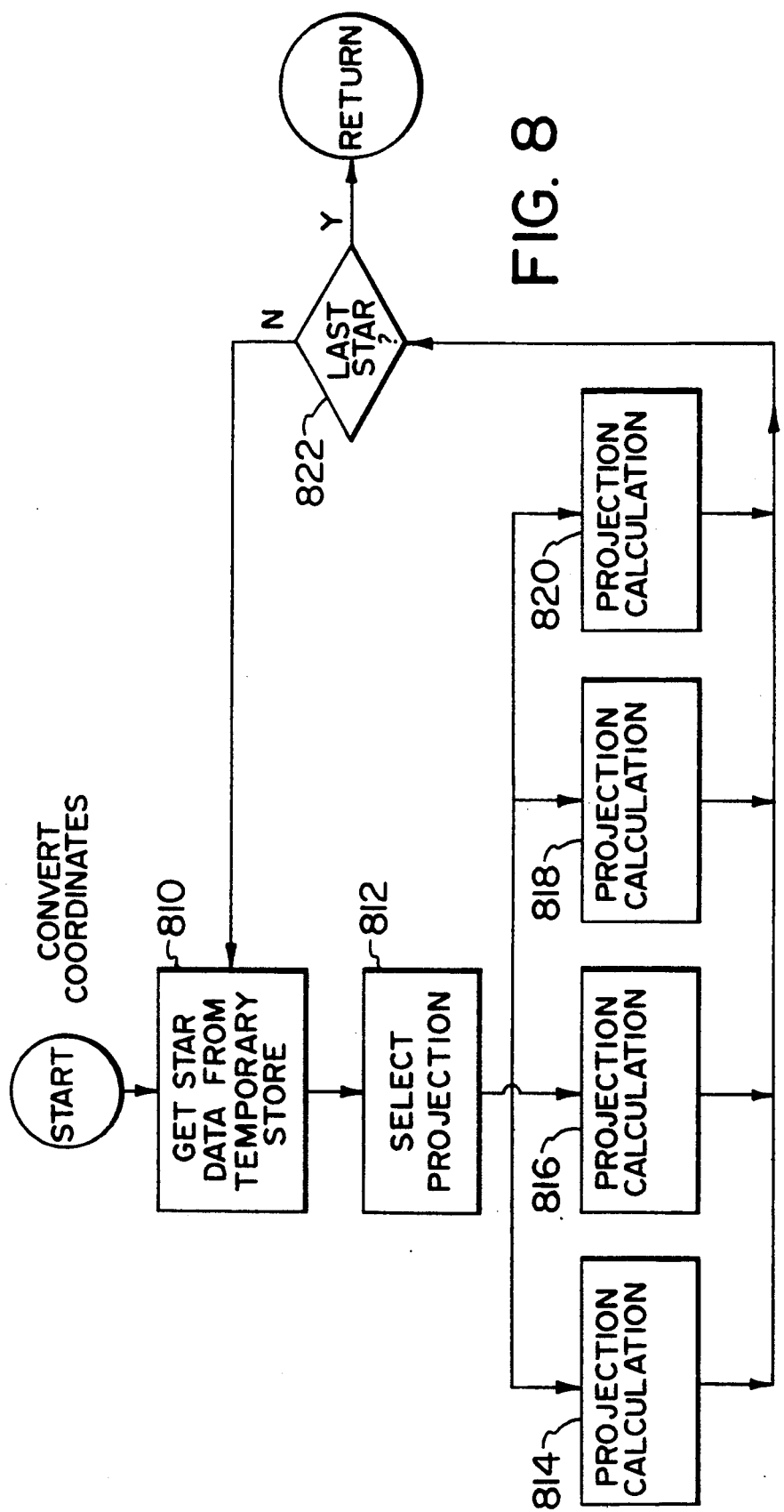
FIG. 8 is a flowchart for the "Convert Coordinates" function of FIG. 6.

The file numbers to be loaded from the YBSC data base are calculated (function Step 622), then are loaded into store (function Step 624) and the chosen stars in the area are extracted (Step 626). After step 626 is performed, or if the "N" decision is taken at step 620, step 628 is performed. If the scale is greater than fifty degrees, the "Y" decision is taken to decision step (Step 628), and the wide field star database is loaded (Step 630). This data base has only the brighter stars. After step 630 is performed, or if the "N" decision is taken at step 620, the "Convert Coordinates" function step, (Step 632), which is shown in more detail in FIG. 8, is performed by the coordinate converter 126 (shown previously in FIG. 1). After the "Convert Coordinates" function 632 is carried out, the program returns to the function "Generate Star Map" (FIG. 4) and the next subroutine "Display Stars" (Step 418) is performed.

Figure 7:
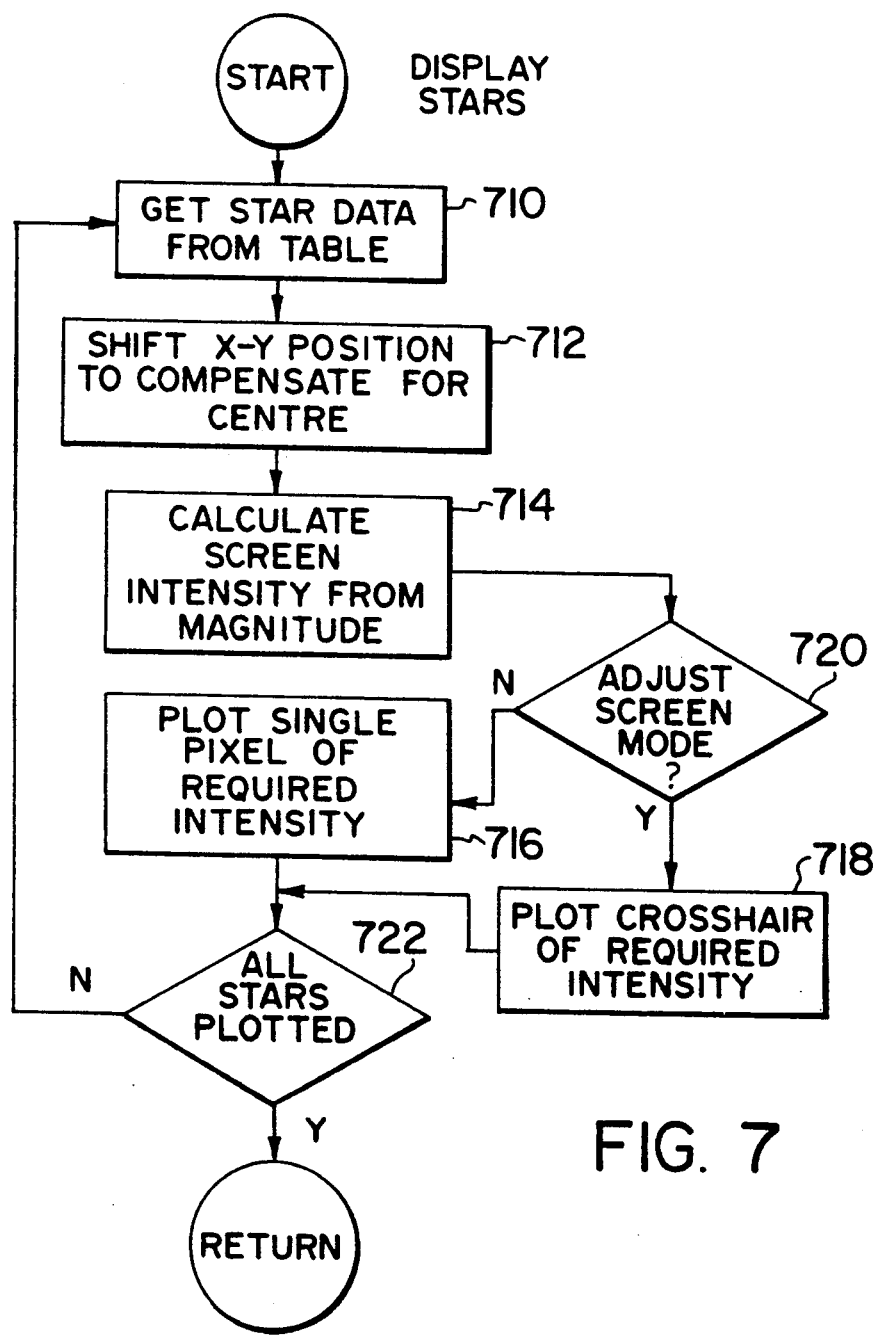
FIG. 7 is a flowchart for the "Display Stars" function of FIG. 4.

The "Display Stars" subroutine 418 is shown in detail in FIG. 7 and involves the parser 120 and the display driver 127. The first step, "Get Star Data From Table" (function Step 710) and the "Shift x-y Position To Compensate For Centre" step, (function Step 712) offsets each individual celestial body's x-y coordinates to compensate for the change in the cursor x-y coordinates. The screen intensity is then calculated, in the "Calculate Screen Intensity From Magnitude" step (function Step 714), using the magnitude of the star as given in the data. The "Adjust Screen" decision mode is then performed (Step 720). If the N decision is taken, the "Plot Single Pixel Of Required Intensity" step (function Step 716) is taken to display pinpoints of light. If the Y decision is taken, the "Plot Crosshair Of Required Intensity" function step (Step 718) is performed so that a plot of the cross-hairs of the required intensity will be displayed. Generally, the "Adjust Screen" decision will only be selected during the initial alignment, though it can be selected at any other time, provided there is no requirement to drive the telescope 110 at the same time. Both step 716 and step 718 are followed by decision step 722. As provided for by a loop and decision step 722, the N decision returns to the "Get Star Data From Table" function step (Step 710) to display each celestial body in turn. The Y decision step enables the return to the function "Generate Star Map" (Step 318) and the next subroutine, "Display Status" step (Step 420), is performed.

As shown in FIG. 8, the first step, "Get Star Data From Temporary Store" (function Step 810), is to get star data from the temporary store 125. Depending upon the precalculation steps 512 and 514 (FIG. 5) which determined the required projection and set a flag, the coordinate converter 126 will carry out the "Select Projection" step (function Step 812), and with one of a series of four optional steps, namely Projection Calculation steps (function Step 814), (function Step 816), (function Step 818) and (function Step 820), to lead to the "Last Star" decision step (Step 822). Only four function steps are shown for convenience. The N decision loop from the "Last Star" decision step (Step 822) to the "Get Star Data From Temporary Store" step (function Step 810) provides for each star to be calculated in turn and, when the last star has been done, the "Y" decision of decision Step 822 will return to the "Generate Star Map" function, (FIG. 4), and provide for the "Display Stars" subroutine (Step 418) to be performed as previously noted.

Figure 9:
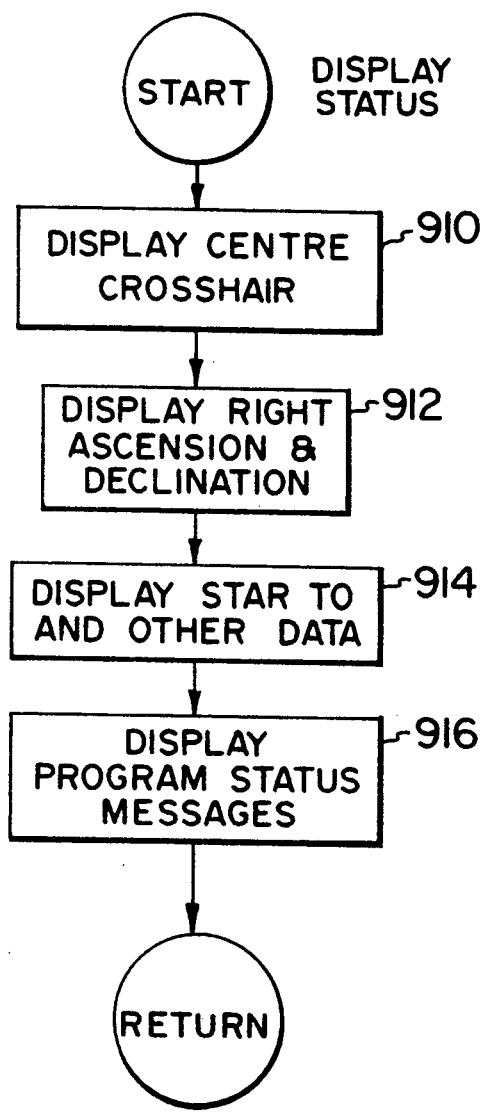
FIG. 9 is a flowchart for the "Display Status" function of FIG. 4.

The "Display Status" subroutine, shown in FIG. 9, begins with the "Display Centre Cross-Hair" step (function Step 910), which displays cross-hairs corresponding to the cursor, followed by the "Display Right Ascension and Declination" step (function Step 912), the "Display Star Identification and Other Data" step (function Step 914), and finally the "Display Program Status Messages" step (function Step 916). A typical Program Status Message might be "Adjust Screen". It will be appreciated that this is merely a selection of the information which might be displayed by this subroutine. The program then returns to the "Generate Star Map" step (Step 318) and the next subroutine "Process Key" (Step 326) is performed.

DESCRIPTION OF FIGS. 10A AND 10B

The "Generate Star Map" subroutine (FIG. 4) performs the "Process Key" step (Step 412) and then all the various calculations are made. The "Process Key" function step (Step 412), is shown in more detail in FIGS. 10A, and 10B. In the "Read Key" function step (Step 1010, FIG. 10A) the parser 120 reads the keyboard 122. The character read from the keyboard is checked by the following steps to determine which key was pressed. First, the routine checks whether a cursor key was pressed to determine whether a movement of the graphics display was requested, and if so, in what direction. If the "Move North?" decision step (Step 1012) takes the "Y" decision, then the function step 1014 "Increment Cursor Dec. By Distance" is performed. It increments the declination part of the cursor register 121 by the appropriate distance. When this has been done, or if the "N" decision was taken at step 1012, the "Move South?" decision step (Step 1016) is executed. If the "Y" decision is taken, the function step 1018 "Decrement Cursor Dec. By Distance" is performed. It decrements the declination part of the cursor register 121 by the appropriate distance. When this has been done, or if the "N" decision was taken at step 1016, the "Move East?" decision step 1020 is executed. If the "Y" decision is taken, the function step 1022 "Decrement Cursor RA By Distance" is performed. It decrements the right ascension part of the cursor register 121 by the appropriate distance. When this has been done, or if the "N" decision was taken at step 1020, the "Move West?" decision step 1024 is executed. If the "Y" decision is taken, the function step 1026 "Increment Cursor RA By Distance" is performed. It increments the right ascension part of the cursor register 121 by the appropriate distance. When this has been done, or if the "N" decision was taken at step 1024, the "Position Change?" decision step 1028 is executed.

If the "Y" decision is taken at decision step 1028, the "Get New Cursor Coordinates from Keyboard" step 1030 is executed. This step will read new coordinates from the keyboard 122. Next, the "Adjust Cursor RA and Dec Position Indicators" step 1032 modifies the RA and Dec portions of the Cursor Register 121 to reflect the newly-entered coordinates.

Following step 1032, or if the "N" decision is taken at step 1028, decision step "Set Scale?" 1042 is taken. If the "Y" decision is taken, the "Set Scale According to Which Scale Key Pressed" step is taken (step 1044). The field of view is selected according to which scale key was pressed. The scale is saved in a register which is later read by the "Pre-calculate" step 414 and the "Read File" step 416.

Following step 1044, or if the "N" decision is taken at step 1042, the "Set Slew Distance?" step 1048 is taken. If the "Y" decision is taken, the "Set Distance According to Which Scale Key Pressed" step 1050 is executed. This step sets a register which is read by steps 1014, 1018, 1022 and 1026 to determine by how much to increment or decrement the Cursor Register 121.

Following step 1050, or if the "N" decision is taken at step 1048, the "Toggle Graphics?" decision step 1052 is executed. If the "Y" decision is taken, the "Set/Clear Flag Enabling Graphics Display" step 1054 is executed. A control flag for the graphics display is toggled to control whether the graphics display is on or off.

Following step 1054 or if the "N" decision is taken at step 1052, the "Toggle Adjust Screen Mode?" decision step 1056 is executed. If the "Y" decision is taken, the "Set/Clear Adjust Screen Flag" step 1058 is executed. The Adjust Screen flag is toggled. This flag is read by the "Drive Telescope" step 1092 to determine whether the telescope is being aligned or driven.

Following step 1058 or if the "N" decision is taken at step 1056, the "Disable Status?" decision step 1060 is executed. If the "Y" decision is taken, the "Set/Clear Flag Enabling Status Display" step 1062 is executed. A flag is toggled which controls the display of operating system status on the graphics display.

Following step 1062, or if the "N" decision is taken at step 1060 is taken, the "Display Refresh?" decision step 1064 is executed. If the "Y" decision is taken, the "Set Flag Indicating Display Refresh" step 1066 is executed. When this refresh flag is set, the "Read File" step 416 will load new data from the database.

Following step 1066 or if the "N" decision at step 1064 is taken, the "X-Y Scale Adjust?" decision step 1068 is executed. If the "Y" decision is taken, the "Display Old X-Y Scale Values" step 1070 is executed. The X and Y scale registers instruct the "Pre-Calculate" step 414 to adjust the aspect ratio of the graphics display. The old values are displayed on the graphics display. Next the "Get New Values From Keyboard" step 1072 is executed. New X and Y scale values are loaded from the keyboard. Next the "Set X-Y Scale Variables" step 1074 is executed, and the new X and Y scale values are written to the registers.

Following step 1074, or if the "N" decision at step 1068 is taken, the "Search?" decision step 1076 is executed. If the "Y" decision is taken, the "Get Name Of Body from Keyboard" step 1078 is executed. The name of a celestial object is obtained from the keyboard. Next the "Search Through Data Base for Body" step 1080 is taken, and the data base is searched for a celestial body having that name. Next the "Set New Cursor Coordinates, Set Refresh Flag" step 1082 is taken. If a valid celestial body was found by step 1080, the right ascension and declination of the celestial body are copied into the Cursor Register 121, and the Refresh Flag is set as before.

Following step 1082, or if the "N" decision at step 1076 is taken, the "Done?" decision step 1084 is executed. If the "Y" decision is taken, the "Exit To Main Menu" step 1086 is executed, which causes the graphics display program to terminate and returns control to the Main Menu 314.

If the "N" decision is taken at step 1084, then the "Screen Changed?" decision step 1088 is taken. This checks whether the Cursor Register 121 has been modified. If so, the "Y" decision is taken to the "Set Refresh Flag" step 1090, which sets the Refresh Flag as before.

DESCRIPTION OF FIG. 11

Following step 1090, or if the "N" decision is taken at step 1088, the "Drive Telescope" step 1092 is executed. This is described in more detail in FIG. 11.

The detection of new coordinates ultimately will result in a slew command being given to the telescope motors 112, 113. Thus, in decision step 1110, "Cursor RA,DEC.=RA,DEC.?" the parser 120 compares the RA and Dec. readings of the cursor register 121 and telescope register 119. If they are equal, the telescope need not be driven and the Y decision from decision Step 1110 is taken, whereby the routine exits (Returns) to the "Generate Star Map" routine (FIG. 4). If they are not equal, the "N" decision for step 1100 leads to the "Telescope View Enabled" decision step (Step 1112). If the N option of the "Telescope View Enabled" decision step (Step 1112) is selected, the routine again returns to the "Generate Star Map" routine. If the Y option of the "Telescope View Enabled" decision is taken the "Adjust Screen" decision step (Step 1114) is executed. If the "N" option of step 1114 is taken, the difference between cursor register RA and telescope register RA is calculated, together with the corresponding difference in declination in the "Calculate Cursor RA—Scope RA And Cursor Dec.—Scope Dec." function step (Step 1116). Thereafter, a command is sent to the motor controller 117, by the "Send Command To Motor Controller" function step (Step 1118) to operate the corresponding stepper motors 112, 113. Function step 1120 "Set Scope RA=Cursor RA, Scope Dec.=Cursor Dec." saves the present RA;DEC values as the new starting point or datum, i.e., sets the telescope register 119 equal to the cursor register 121. If the Y option of the "Adjust Screen" decision step 1114 has been selected, the telescope 110 will not be driven, but the telescope register 119 will still be set equal to the cursor register, by means of "Set Scope RA=Cursor RA, Scope Dec.=Cursor Dec." function (Step 1120). This happens during the initial alignment. Following step 1120, control returns to the "Generate Star Map" subroutine.

It should be noted that the contents of the cursor register 121 can be adjusted while the telescope 110 is moving, though usually the register will be set with the telescope 110 at rest. Once the initial alignment on the celestial body of interest has been made, the telescope 110 will start to move towards the desired position. Meanwhile, with the display set to "Telescope View", small positional adjustments may be made to the graphics display and the registers will be updated to reflect those adjustments. The telescope 110 will then be moved until the registers have been equalized.

DESCRIPTION OF FIG. 12

The structure of one embodiment of a novel optical assembly 114 is shown in FIG. 12. A casing 2100 is provided with an optical connection 2110 through which the light rays 2120 collected by the telescope 110 (FIG. 1) is admitted to the interior of casing 2100. Disposed in the path of such light is a beam splitter in the form of a partially-metallized, e.g. partially aluminized, mirror 2130 disposed at a 45 degree angle to the light path. After reflection by mirror 2130 light is brought along optical path 2140 to a diagonal mirror 2150 within an eyepiece 2160 provided with conventional optics including lens 2170. Focusing may be done in the usual manner by varying the distance between lens 2170 and mirror 2130.

Also within the casing 2100 is a video display unit 2180 to enable the superimposing of a graphics display upon the optical image in the eyepiece 2160.

The video display unit 2180 includes a cathode ray tube monitor (CRT) 2190 mounted with its drive circuit 2200 inside an assembly 2210 which has a rotatably adjustable mirror 2220 at one end, allowing lateral adjustment of the image. The entire assembly 2200 may be moved slightly to provide adjustment in the Perpendicular direction. The video display unit 2180 is conveniently the kind used in hand-held video cameras, which are small (typically one inch screen), readily interfaced with the graphics circuit 118, NTSC compatible and operable by a 5 volt power supply. The graphics image displayed on the cathode ray tube 2190 may be a computer-generated star map or symbols representing celestial bodies or markers to facilitate measurements.

A second, fixed mirror 2230 reflects the image towards a diaphragm 2240, a relay lens 2250, and finally to the partially-aluminized mirror 2130. The mirror 2130 transmits 20% of the light from the cathode ray tube 2190 to reach the eyepiece 2160, while reflecting 80% of the light, represented by light rays 2120, from the telescope (110 in FIG. 1) towards the eyepiece 2160. These proportions are suitable because the intensity of the stars or other artefacts displayed on the cathode ray tube may be much brighter than the starlight received by the telescope.

A coloured filter 2252 may be provided between the video display unit 2180 and the beam splitter 2130. The computer-generated star map and the "real" star map will then be different colours, facilitating identification and adjustment. The filter 2252 may then be removed for the observation session.

AS SHOWN IN FIG. 13

Figure 13:
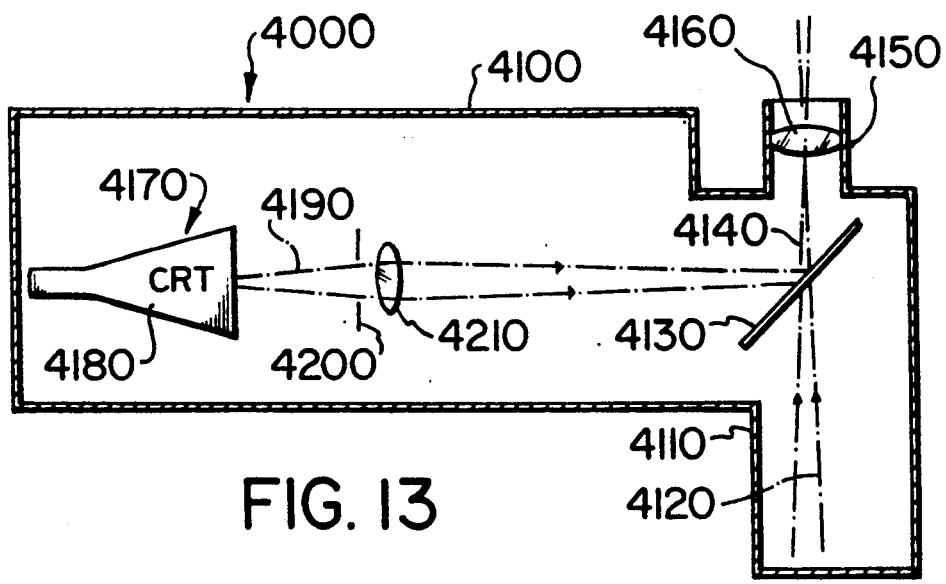
FIG. 13 is a schematic longitudinal section through a telescope optical assembly comprising another embodiment of the invention.

As shown in FIG. 13, an alternative optical assembly 4000 includes a main box 4100, which is provided with an optical connector 4110 through which the light 4120 collected by the telescope (See 110 in FIG. 1) is brought to the interior of the casing 4100. Disposed across the path of such light is a beam splitter in the form of a glass plate 4130, disposed at a 45 degree angle. The light along optical path 4120 is brought though glass plate 4130 along an optical path 4140 within an eyepiece 4150 provided with the conventional optics including lens 4160. Focusing may be done in the usual manner by varying the distance between lens 4160 and glass plate 4130.

Also within main box 4100 is a video display unit 4170 to enable the superimposing of graphical information of celestial bodies in the eyepiece 4150.

The unit 4170 includes a cathode ray tube 4180. The graphics image displayed on the cathode ray tube 4180 is a computer-generated star map or symbols representing celestial bodies. The cathode ray tube images are viewed along optical path 4190, through the diaphragm 4200, the relay lens 4210 and finally to the glass plate 4130. The glass plate 4130 allows a fraction of the light from the cathode ray tube 4180 to reach the eyepiece 4150, while still allowing most of the light 4120 from the telescope (110 in FIG. 1) to reach the eye piece 4150.

This second embodiment of optical assembly may also be modified to include a coloured filter to colour the graphics image to facilitate identification, etc.

GENERAL DESCRIPTION

It should be appreciated that discrimination between the graphics star map and "real" star field might be facilitated by providing a colour video display unit.

Although primarily used for sighting the telescope, super-imposing computer-generated graphics on the image in the eyepiece also allows the system to (a) annotate actual celestial bodies viewed directly in the eyepiece, (b) aid in measurements, (c) locate and identify celestial bodies, (d) track moving celestial bodies, (e) aid in event timing, (f) aid in intensity measurements, and (g) allow the operation of the telescope for training while indoors, by simulating the sky image in the telescope eyepiece. This expands the utility of the telescope graphics display system from a telescope accessory to a complete system for performing scientific observations and training observers.

In one embodiment of an optical assembly, an eyepiece holder on the end of the unit holds a "star diagonal" which reflects the light 90 degrees. The star diagonal in turn holds the eyepiece. This produces non-inverted images, and places the eyepiece in a more accessible location.

This assembly attaches to the telescope. The orientation of the unit relative to the telescope may be adjusted by rotating the entire unit until the star images coincide with the graphics.

This optical assembly also contains a potentiometer for adjusting the graphics display intensity, and a power regulator, e.g. of 5 volts. Power is supplied by an external supply in order to keep the unit lightweight. The power cord also carries the video signal from the computer.

It is necessary to focus the image both of the video display unit and of the sky. Moving the eyepiece in and out of its holder changes the focus of both the telescope image and the video display unit. Adjusting the telescope only affects the telescope image. Therefore the video display unit image must be focused first by adjusting the eyepiece, then the telescope may be adjusted. The computer's EIA standard RS-232 serial interface is used to communicate with the stepper-motor controller. In one embodiment of this invention, the motor controller 117 included a 6809 microprocessor, EPROM, RAM, parallel interface, serial interface, and timer. The serial interface provides communications with the main computer. The timer produces the baud rate for the serial interface, keeps track of sidereal time, and determines the stepping rate of the motors.

Provision may also be made for connecting a small hand paddle to the motor controller.

When the computer is driving the telescope, the graphics display shows the stars in the direction the telescope is pointing. Five scales are available, ranging from a wide-field view of approximately 50 degrees, through 30, 5 and 2 degrees to a view corresponding to the telescope field of approximately 0.35 degrees (Telescope View). Textual information can be superimposed on this image.

The cursor/numeric keypad is used to control the telescope and star display position.

Functions may be provided for locating and identifying celestial bodies. The first key, when pressed, displays the identity of a celestial body centered in a central cross-hair. When the second key is pressed, the computer prompts the user for the name of the celestial body. If the named celestial body is within or just beyond the present graphics display, it is automatically centred on the screen and labelled. The constraint that the celestial body be nearby was imposed to avoid a time-consuming scan of an extremely large data base.

One command was provided which allows the user to type in a new position directly. This could be used if, for example, the observer wishes to slew the telescope to the published location of a comet.

One key allows adjustment of the telescope to match the graphics display. When the key is pressed, an indicator is illuminated on the screen. Pressing the key once permits the telescope to be adjusted without moving the screen. Pressing the key again permits the screen to be adjusted without moving the telescope. Pressing the key a third time returns the system to normal operation.

The main computer software was written and executed on an IBM-PC using Turbo Pascal. This permitted rapid development of structured code. The version of Turbo Pascal used generated code utilizing the 8087 math co-processor for maximum floating-point processing speed.

The data bases were extensively pre-processed to facilitate rapid access. They were sorted into increasing order in Right Ascension. They were then broken up into equal-sized files, and each file was sorted into increasing order in Declination. A table was then stored in a file which indicated the starting Right Ascension for each data file. This file could be accessed by the graphics display program.

Thus, when the graphics display program required stars for a certain area, it could check the table to determine which files to read. It could then scan through those files for the range of Declination required, and process only the stars of interest.

An additional step was required, however, due to the precession of the earth's axis. The earth's axis wobbles slowly in a complex fashion due to a variety of effects. The result of this is that the celestial coordinate system is not an inertial frame: the Right Ascension and Declination of a star change with time. This calculation is complex and time-consuming.

In order to provide the fastest display time possible, the coordinates for all stars in the data bases were precessed in advance of the observing session.

One requirement of the system was that the user be able to slew the telescope a small distance, with the video image following the telescope image in real time. In order to do this, the map projection described above is performed as the data is loaded, not as it is displayed. This allows the graphics display to be translated up and down rather than completely recalculating the projection.

A new graphics display can be generated in 1-2 seconds using this technique, although loading a new star field display and computing the map projection can take up to 10 seconds on an 8 MHz 8088-based PC with an 8087 math coprocessor. For short slews, the telescope takes approximately 2 seconds to move, so the response time of the system is quite suitable.

As mentioned previously, the area represented by the data loaded from the data base 120 is approximately six times larger than the screen so that the view can be shifted a substantial distance before running out of data. Since loading new data into the temporary store requires approximately 10 seconds, it is not done automatically. Instead, the user presses a key when new data is required, and the computer then loads and processes the required data.

The graphics display is double-buffered. When the operator presses a slew key, a new graphics display image is written out to the background buffer. The background and foreground buffers are then swapped. This makes the writing operation transparent.

A star image is represented by a single illuminated pixel or picture element. One of sixteen grey levels is chosen depending on the magnitude of the star. For the smaller scale displays, on which fainter stars should be visible, the images are brightened by several magnitudes. This provides the most natural and realistic display at all scales: one range of scales represents naked eye viewing, one range represents binocular or finderscope viewing, and one range represents telescope viewing. This also corresponds quite well with the magnitude ranges of the three data-bases.

A star image i.e. its graphics artefact is displayed using special routines which calculate the correct bit patterns to output to the hardware. Look-up tables were used extensively to provide an extremely fast graphics driver.

As mentioned previously, the observer finds the celestial body on a large-scale view mode, then switches to the telescope view mode. At that time, the computer transmits the slew command. While moving around in the telescope view mode, short slew commands are used. When a high-speed slew is requested, the routine switches to a second set of memory locations: the "coarse" distance-to-go locations. The "fine" set retains their contents; in fact the Right Ascension location is still incremented regularly by the sidereal time. The "coarse" set indicates the distance to travel in 16-step increments. This permits longer-range slews. The computer 115 calculates the number of steps needed to move the telescope the required distance. This information is sent to the motor controller using a simple protocol, as demonstrated by the following examples:

| Command | Action |
| --- | --- |
| R0100 | Move 100 (hex) steps in increasing Right Ascension |
| DFF00 | Move 100 (hex) steps in decreasing Declination (FF00 = −0100 in two's complement) |
| M01000FFF000 | Slew 1000 (hex) steps in increasing RA, and 100 (hex) steps in decreasing Declination |
| S | Stop immediately |

The number of steps actually refers to the number of half-steps taken by the motors. The protocol was designed for two modes of operation. One is used for short distance slews, e.g. for centering a celestial body in the eyepiece. The other mode is used for long distance, high speed slewing.

The "R" and "D" commands allow the user to move the telescope a small distance at a fairly low speed. Since the user can press a slew key several times in succession, the motor controller accumulates all the commands.

The "M" command allows the user to slew the telescope a long distance. The distance in both directions is specified in the command, and larger numbers are permitted.

Embodiments of this invention may be used in a variety of applications. The system could be used as a training device, or as a general purpose observing aid. As an observing aid, the operating system could assist in the performance of measurements, locating objects, identifying objects, photographing moving celestial bodies, and a variety of other functions. As a training tool, it could provide a realistic indoor "sky simulation", and a smooth transition to actual observing conditions. Students could watch the monitor 128 while the instructor operated the telescope directly, using its manual controls.

The system could be used as a tool during regular observing sessions. Possible applications include position measurement; locating celestial bodies, identifying celestial bodies, tracking moving celestial bodies, timing events, intensity measurement, and auxiliary observing aids.

Several types of measurements can be made using a small telescope. For example, the measurement of separation and position angle of double stars can be performed. Such observations are presently done using several techniques, many of which have poor accuracy. Using the eyepiece graphics display system, the operator could align two computer-generated cross-hairs on different points in the sky. The computer would ensure that they appear motionless with respect to the stars even as the telescope moves, and could calculate their exact position angle and displacement. This would reduce bias and error, as well as permitting the measurement of distances larger than one eyepiece field. Two dimensional measurements could also be made much more easily. An application of this could be the measurement of the position and direction and speed of motion of a newly-discovered celestial body.

One technique for locating celestial bodies is to use their celestial coordinates, as given in a table. This is often not sufficient, however, to identify easily a particular faint star in a crowded field. The alternative, "star-hopping" for an easily located bright celestial body following a star chart, can be time consuming and difficult. Thus, a fair degree of skill can be required to make what otherwise would be fairly simply observations.

The eyepiece graphics display is very useful in crowded star fields, in that it would annotate the desired star in the display. This is especially useful if the telescope slewing accuracy is limited, since the observer can adjust the graphics star pattern to match the actual star pattern. This would ensure accurate positioning and correct star identification.

If for example, the user was interested in observing a particular variable star, the system would identify the star, and label several nearby fixed comparison stars as well. The system would then slew between the stars on request to permit rapid comparison of their intensities. Information on the comparison stars e.g. their catalog designation and visual magnitude would also be displayed in the eyepiece. The acquired data and time of each observation would be stored by the system, either using keyboard input or by directly reading the measuring instrument. This same technique may be applied to asteroidal observations. The computer would calculate the exact position of the celestial body any time, and indicate this on the display. This would greatly speed up the task of identifying the correct celestial body, and reduce the possibility of error.

This method may also be used to time re-appearances of stars from behind the moon during an occultation. Since the star cannot be seen until after the re-appearance, the event is often missed due to a misaligned telescope. The exact position of the telescope would be checked a few minutes before the event, and an indicator would show the expected location of re- appearance.

Many amateur astronomers regularly patrol the skies looking for new objects, e.g. comets, asteroids, novae, and supernovae. The head-up display system of an aspect of this invention with a large object catalog may annotate the known celestial bodies, in order to distinguish them from new objects.

Once a new celestial body is discovered, the measurement functions may be used accurately to determine the position of the celestial body. The observer would center a computer-generated cross-hair display on the celestial body, and the computer would automatically calculate the position. By repeating this a short time later, the computer would calculate the direction and speed of motion of the celestial body. The time of each observation would also need to be stored for this purpose.

Astrophotography typically involves long time exposures. In order to ensure correct tracking, the instrument must be manually guided to prevent trailing of the image. This involves using a cross-hair eyepiece aligned on a nearby star. In the case of celestial bodies e.g. comets, which move quickly with respect to the background stars, guiding can be very difficult, or even impossible.

One method for photographing these celestial bodies to align a reticule on a fixed star. This reticule is then carefully adjusted at regular intervals in an opposite direction to the motion of the celestial body. If this moving reticule is kept aligned on the fixed star, the telescope will be slowly moved to track the celestial body.

Since the computer can easily calculate the expected motion of the celestial body, and can generate an image of a reticule in the eyepiece, it can perform the tedious task of accurately adjusting the reticule position.

A potential application of the operating system is the timing of events, such as the appearance and disappearance of a star during an occultation. Ideally this would be done using a high-speed, high-sensitivity photometer, but these can be difficult to construct. A similar approach uses the eyepiece graphics display as a timing mechanism.

The method of operation heretofore is similar to the "eye-and-ear" approach, in which the observer attempts to estimate tenths of seconds between successive tones from a time signal. This method virtually eliminates the observers' response time from the measurement. The difficulty lies in estimating the tenths of seconds. With the graphics system, ten bars would be illuminated in sequence in the eyepiece to indicate tenths of seconds. They would be grouped in two sets of five so that the pattern of lights would be easily read and remembered. The observer need only remember the appearance of the image at the instant the event occurs; the number of illuminated bars indicate the exact fraction of a second at which the event occurred.

Another application of the invention may be the measurement of the magnitudes of stars and other celestial bodies. The procedure would be for the observer to adjust the intensities of three artificial star images until they matched the intensities of a target star and two comparison stars. With the two comparison stars bracketing the target star in magnitude, the computer would interpolate the magnitude of the target star. This would have several advantages for visual magnitude estimates, including reduction of bias, and an increase in precision. This would provide an improvement in quality of observations on telescopes not equipped with photometer equipment. This technique may also be easier to use than photometer equipment, although probably not as accurate. It would, of course, necessitate careful calibration of the display intensities, and would probably require a large range of grey scale values from the display hardware.

Another application of this invention is the measurement of the integrated magnitude of diffuse celestial bodies, e.g. comets. At present, this is quite difficult to do because the large celestial bodies do not fit into the small diaphragms of most photometers. If the diaphragms are made larger, sky background and nearby stars cause further difficulties. Visual observations are also difficult because comparing a diffuse celestial body to a discrete source, e.g. a comparison star, is extremely difficult. A typical method, heretofore proposed although awkward, would be to defocus the telescope until the comparison star images appear roughly the same size. The operating system, however,,may be used to generate a graphical image of a diffuse celestial body with a known integrated magnitude. The size, condensation and intensity of the image would be adjusted by the observer until it matched the comet, then an accurate intensity value could be read out.

There are three modes in which the telescope operating system of this invention could be used as a teaching tool: classroom demonstration; indoor practice; and field operation.

In the first mode, the telescope eyepiece display would be replaced by a standard video monitor. The monitor could display views ranging from "star-map" size to actual telescope field size. Control of the "telescope" position would be via the keyboard or a joystick. An instructor could use this to demonstrate basic observing procedures to a small group of students.

Techniques such as star-hopping and the use of coordinate setting circles could be demonstrated. The relationship between the field of view seen in the telescope and on star maps could be shown. The conditions of typical events could be simulated, and observation techniques demonstrated. For example, variable star observations could be simulated, complete with standard comparison stars and an artificial variable star.

Using the telescope operating system of this invention with an eye-piece graphics display would permit a real-time simulation of the night-time observing enviroment indoors, using the actual telescope under normal lighting conditions. Thus, the telescope operating system of this invention effectively functions as a realistic, real-time night sky simulator.

With the telescope operating system of this invention simulating the appearance of the sky, as seen through the telescope eyepiece, the student could practice operating the telescope. A tutorial manual or special software could be used to teach techniques such as star-hopping, star identification, and various types of observations. The student could become familiar with the telescope and its operation under comfortable conditions, and attempt simulated observing runs (with known event data for testing purposes).

This technique would provide a means for evaluating an observer's proficiency and accuracy in performing various types of observations. The ability of the system to generate accurate simulations of various events could also be used by experienced observers in preparing for difficult observing runs.

Once operating in the field, the student could use the system to aid in locating celestial bodies. Upon request, the display could show telescope position, and identify objects centred in the eyepiece.

A computer-generated star map can be synchronized to the telescope position. The user may command the computer to scroll star maps on the screen, with the computer moving the telescope to "track" the display. In another mode, by sensing the position of the telescope, the computer may scroll the star maps as the user moves the telescope manually. Thus, a fast, user-friendly interface simplifies the operation of the telescope. The detailed star field displays eliminate the need for handling large, awkward star maps.

An advantage of this arrangement is that the telescope can be moving towards the sight position while the final adjustments are being made to the sighting of the graphics artefact.

In addition to superimposing a graphics display representing a star field upon the image formed by the telescope embodiments of the invention may display information on the celestial bodies being observed and/or assist in the performance of measurement. Embodiments of the present invention also provide for many aspects of telescope control, data base management and graphics generation.

An advantage of embodiments of the invention is the ease-of-use and relative accuracy achieved without the considerable expense associated with professional tracking telescopes which employ precision components and sophisticated control systems.

CONCLUSION

From the foregoing description, one skilled in the art can easily ascertain the essential characteristics of this invention, and without departing from the spirit and scope thereof, can make various changes and modifications of the invention to adapt it to various usages and conditions. One such modification which is presently envisaged is that the stepper motors 112 and 113 could be omitted and the user could slew the telescope manually. The shaft encoders would detect the movement of the telescope as previously described and the graphics display would track the manual movement of the telescope. Consequently, all such changes and modifications are properly, equitably, and "intended" to be, within the full range of equivalence of the following claims.

We claim:

1. A method of operating a telescope, having an eyepiece, with the aid of a graphics system having a data base of celestial bodies, and means for generating and displaying a graphics display comprising graphics artefacts, each representing an associated celestial body, comprising the steps of:

correlating, as a datum, the position of said telescope with the position of said graphics display corresponding to the field of view of said telescope;

displacing said graphics display to show a target graphics artefact representing a celestial body of interest;

detecting the effective distance moved in displacing said graphics display; and moving said telescope a corresponding distance, such that an image of said celestial body of interest is visible in said eyepiece of said telescope and said target graphics artefact is visible in said graphics display.

2. A method as defined in claim 1, wherein said step of moving said telescope is initiated by selection of a field of view of said graphics display that corresponds to the field of view of said telescope.

3. A method as defined in claim 1, including the further steps of: selecting, from said data base, data for generating a field of graphics artefacts several times larger than that of said graphics display: storing said data; and accessing portions of said stored data selectively and successively so as to display different portions of said field.

4. A method as defined in claim 1, wherein said data for said graphics artefacts includes celestial coordinates; and wherein said method further comprises the step of processing said data for said graphics artefacts to take account of sidereal time before storing said data for access in generating said graphics display.

5. A method as defined in claim 1, wherein each said graphics artefact has an intensity corresponding to the magnitude of the celestial body represented thereby.

6. A method as defined in claim 1, wherein each of said graphics artefact comprises a single picture element.

7. A method as defined in claim 1, further including the step of displaying, in said graphics display, information about the celestial body represented by each said graphics artefact.

8. A method as defined in claim 1, further comprising the step of displaying, in said graphics display, information about the operating system status.

9. A method as defined in claim 1, wherein said step of correlating the position of said telescope with the position of said graphics display comprises the steps of:

selecting a reference celestial body in the field of view of said telescope;

inputting data for said reference celestial body into a data base to select data for a corresponding graphics display including a reference graphics artefact representing said reference celestial body; and establishing the respective positions of said telescope and said corresponding graphics display as said datum.

10. A method as defined in claim 9, wherein: said image of said reference celestial body is substantially centered in the field of view of said telescope; and wherein said reference graphics artefact is substantially centered in said graphics display.

11. A method as defined in claim 1, wherein: said step of displacing said graphics display comprises the steps of:

selecting, from said data base, data for generating said target graphics artefact and a surrounding graphics display; and determining, as said effective distance, the distance between said reference celestial body and said celestial body of interest; and wherein:

said step of moving said telescope comprises moving said telescope automatically in dependence upon such determination step.

12. A method as defined in claim 11, wherein said step of moving said telescope is responsive to the selecting of a predetermined field of view of said graphics display that corresponds to the field of view of said telescope.

13. A method as defined in claim 1, wherein: said step of correlating comprises the steps of:

selecting a reference celestial body whose image is within the field of view of said telescope;

inputting data for said reference celestial body into a data base to select data for a corresponding graphics display including a reference graphics artefact representing said reference celestial body;

displaying said graphics display superimposed upon said field of view of the telescope;

moving said graphics display to align said image of said reference celestial body with said reference graphics artefact; and establishing the positions of said telescope and said graphics display at such alignment as said datum.

14. A method as defined in claim 13, wherein said step of moving said graphics display is such that said graphics display is superimposed upon said field of view of said telescope in the eyepiece thereof.

15. A method as defined in claim 13, including the further step of converting said reference graphics artefact into a cross-hair when moving said graphics display to align said celestial body of interest with said reference graphics artefact.

16. A method as defined in claim 15, wherein said further step of converting said reference graphics artefact is coupled to the step of selecting a predetermined viewing angle for said graphics display that corresponds to that of said telescope.

17. A method as defined in claim 13, wherein said step of moving said graphics display is such that said reference graphics artefact is superimposed upon the image of said reference celestial body.

18. A method as defined in claim 17, including the further step of converting said reference graphics artefact into a cross-hair when superimposing said reference graphics artefact upon said image of said reference celestial body.

19. A method as defined in claim 18, wherein said graphics display is superimposed upon said field of view of said telescope in the eyepiece thereof.

20. A method of operating a telescope, having an eyepiece, with the aid of a graphics system having a data base of celestial bodies, and means for generating and displaying a graphics display comprising graphics artefacts, each representing an associated celestial body, comprising the steps of:

correlating, as a datum, the position of said telescope with the position of said graphics display corresponding to the field of view of said telescope;

displacing said telescope until a celestial body of interest is in the field of view of said telescope;

detecting the effective distance moved in displacing said telescope; and displacing said graphics display effectively to track the movement of said telescope such that an image of said celestial body of interest is visible in said eyepiece of said telescope and a target graphics artefact representing said celestial body of interest is visible in said graphics display.

21. A method as defined in claim 20, including the further steps of: selecting, from said data base, data for generating a field of graphics artefacts several times larger than that of said graphics display: storing said data; and accessing portions of said stored data selectively and successively so as to display different portions of said field.

22. A method as defined in claim 20, wherein said data for said graphics artefacts includes celestial coordinates; and wherein said method further comprises the step of processing said data for said graphics artefacts to take account of sidereal time before storing said data for access in generating said graphics display.

23. A method as defined in claim 20, wherein each said graphics artefact has an intensity corresponding to the magnitude of the celestial body represented thereby.

24. A method as defined in claim 20, wherein each said graphics artefact comprises a single picture element.

25. A method as defined in claim 20, further including the step of displaying, in said graphics display, information about the celestial body represented by each said graphics artefact.

26. A method as defined in claim 20, further comprising the step of displaying, in said graphics display, information about the operating system status.

27. A method as defined in claim 20, further including the step of changing the graphics display to represent fields of view of the telescope that are different in area and, when a larger area is displayed, selecting a reduced set of graphics artefacts having a brightness over a predetermined threshold.

28. A method as defined in claim 20, wherein said step of correlating the position of said telescope with the position of said graphics display corresponding to the field of view of said telescope comprises the steps of:

selecting a reference celestial body in the field of view of said telescope;

inputting data for said reference celestial body into a data base to select data for a corresponding graphics display including a reference graphics artefact representing said reference celestial body; and establishing the respective positions of said telescope and said corresponding graphics display as said datum.

29. A method as defined in claim 28, wherein: said reference celestial body is substantially centered in the field of view of said telescope; and wherein said reference graphics artefact is substantially centered in said graphics display.

30. A method as defined in claim 20, wherein: said step of correlating comprises the steps of:

selecting a reference celestial body within the field of view of said telescope;

inputting data for said reference celestial body into a data base to select data for a corresponding graphics display including a reference graphics artefact representing said reference celestial body;

displaying said graphics display superimposed upon said field of view of the telescope;

displacing said graphics display to align said reference celestial body with said reference graphics artefact; and establishing the positions of said telescope and said graphics display at such alignment as said datum.

31. A method as defined in claim 30, wherein said step of moving said graphics display is such that said graphics display is superimposed upon said field of view of said telescope in the eyepiece thereof.

32. A method as defined in claim 30, including the further step of converting said reference graphics artefact into a cross-hair when displacing said graphics display to align said reference celestial body with said reference graphics artefact.

33. A method as defined in claim 32, wherein said further step of converting said reference graphics artefact is coupled to the step of selecting a predetermined viewing angle for said graphics display that corresponds to that of said telescope.

34. A method as defined in claim 32, wherein said step of converting said reference graphics artefact is coupled to the step of selecting of a predetermined viewing angle for said graphics display that corresponds to that of said telescope.

35. A method as defined in claim 34, wherein said graphics display is superimposed upon said field of view of said telescope in the eyepiece thereof.

36. A method as defined in claim 30 wherein said step of displacing said graphics display is such that said reference graphics artefact is superimposed upon said image of said reference celestial body.

37. A method as defined in claim 36, including the further step of converting said reference graphics artefact into a cross-hair when superimposing said reference graphics artefact upon said image of said reference celestial body.

38. A method as defined in claim 37, wherein said graphics display is superimposed upon said field of view of said telescope in the eyepiece thereof.

39. A method as defined in claim 37, wherein said step of converting said reference graphics artefact is coupled to the step of selecting of a predetermined viewing angle for said graphics display that corresponds to that of said telescope.

40. A method as defined in claim 39, wherein said graphics display is superimposed upon said field of view of said telescope in the eyepiece thereof.

41. Apparatus for operating a telescope, having an eyepiece, comprising:

a data base of celestial bodies;

means for generating and displaying a graphics display comprising graphics artefacts, each representing an associated celestial body;

means for correlating, as a datum, the position of said telescope with the position of said graphics display, said graphics display corresponding to the field of view of said telescope;

means for displacing said graphics display to show a target graphics artefact representing a celestial body of interest;

means for detecting the effective distance moved in displacing said graphics display; and means for moving said telescope a corresponding distance, such that an image of said celestial body of interest is visible in said eyepiece of said telescope and said target graphics artefact is visible in said graphics display.

42. Apparatus as defined in claim 41 wherein said means for moving said telescope is responsive to the selecting of a predetermined viewing angle for the graphics display that corresponds to that of said telescope.

43. Apparatus as defined in claim 41, further including: means for selecting, from said data base, data for generating a field of graphics artefacts several times larger than that of said graphics display; means for storing said selected data; and means for accessing portions of said stored data selectively and successively so as to display difference portions of said field.

44. Apparatus as defined in claim 41, wherein said data base holds data for said graphics artefacts, said data including celestial coordinates, said apparatus further comprising coordinate converter means for processing said data for said graphics artefacts to take account of sidereal time and means for storing the processed data for access in generating said graphics display.

45. Apparatus as defined in claim 41, wherein said graphics display means includes means for displaying each said graphics artefact with an intensity corresponding to the magnitude of the celestial body represented thereby.

46. Apparatus as defined in claim 41, wherein said graphics display means serves to display each said graphics artefact as a single picture element.

47. Apparatus as defined in claim 41, wherein said graphics display means further includes means for displaying information about the celestial body represented by each said graphics artefact.

48. Apparatus as defined in claim 41, wherein said graphics display means further comprises means for displaying information about the operating system status.

49. Apparatus as defined in claim 41, further comprising means for changing the graphics display to represent fields of view of the telescope that are of different areas and, when a larger area is to be displayed, selecting a reduced set of graphics artefacts having a brightness over a predetermined threshold.

50. Apparatus as defined in claim 41, wherein said means for correlating the position of said telescope with the position of said graphics display comprises:

means for inputting data for a reference celestial body in the field of view of said telescope into a data base to select data for a corresponding graphics display including a reference graphics artefact representing said reference celestial body; and means for establishing the respective positions of the telescope and said corresponding graphics display as said datum.

51. Apparatus defined in claim 50, wherein said means for correlating the position of said telescope with the position of said graphics display comprises means for positioning said reference celestial body substantially centered in the field of view of the telescope and for positioning said reference graphics artefact substantially centered in said graphics display.

52. Apparatus as defined in claim 41, wherein said means for displacing said graphics display comprises:

means for selecting, from said data base, data for generating said target graphics artefact and a surrounding graphics display; and means for determining, as said effective distance, the effective distance between said reference celestial body and said celestial body of interest; and wherein said means for moving said telescope is operative to move said telescope automatically in response to said determining means.

53. Apparatus as defined in claim 52, wherein said means for moving said telescope is responsive to the selecting of a predetermined field of view of said graphics display that corresponds to the field of view of said telescope.

54. Apparatus as defined in claim 41, wherein said means for correlating comprise:

means for inputting data for a reference celestial body whose image is visible within the field of view of said telescope into a data base to select data for a corresponding graphics display including a reference graphics artefact representing said reference celestial body;

means for displaying said graphics display superimposed upon said field of view of the telescope;

means for moving said graphics display to align said image of said reference celestial body with said reference graphics artefact; and means for establishing the positions of said telescope and said graphics display at such alignment as said datum.

55. Apparatus as defined in claim 54, further comprising means for superimposing said graphics display upon said field of view of said telescope in the eyepiece thereof.

56. Apparatus as defined in claim 54, further comprising means for converting said reference graphics artefact into a cross-hair when moving said graphics display to align said reference celestial body with said reference graphics artefact.

57. Apparatus as defined in claim 56, wherein said means for converting said reference graphics artefact is responsive to the selecting of a predetermined viewing angle for the graphics display that corresponds to that of the telescope.

58. Apparatus as defined in claim 54, wherein said means for moving said graphics display serves to superimpose said reference graphics artefact upon said image of said reference celestial body.

59. Apparatus as defined in claim 58, further comprising means for converting said reference graphics artefact into a cross-hair when superimposing said reference graphics artefact upon said image of said reference celestial body.

60. Apparatus as defined in claim 59, further comprising means for superimposing said graphics display upon said field of view of said telescope in the eyepiece thereof.

61. Apparatus as defined in claim 59, wherein said means for converting said reference graphics artefact is responsive to the selecting of a predetermined viewing angle for the graphics display that corresponds to that of the telescope.

62. Apparatus as defined in claim 61, further comprising means for superimposing said graphics display upon said field of view of said telescope in the eyepiece thereof.

63. Apparatus for operating a telescope having an eyepiece, comprising:
- a data base of celestial bodies;
- means for generating and displaying a graphics display comprising graphics artefacts, each representing an associated celestial body;
- means for correlating, as a datum, the position of said telescope with the position of said graphics display, said graphics display corresponding to the field of view of said telescope;
- means for displacing said telescope until a celestial body of interest is in the field of view of said telescope;
- means for detecting the effective distance moved in said displacing of said telescope; and
- means for displacing said graphics display effectively to track the movement of said telescope, such that an image of said celestial body of interest is visible in said eyepiece of said telescope, and a target graphics artefact representing said celestial body of interest is visible in said graphics display.

64. Apparatus as defined in claim 63, further including: means for selecting, from said data base, data for generating a field of graphics artefacts several times larger than that of said graphics display; means for storing said selected data; and means for accessing portions of said stored data selectively and successively so as to display different portions of said field.

65. Apparatus as defined in claim 63, wherein said data base holds data for said graphics artefacts, said data including celestial coordinates, said apparatus further comprising coordinate converter means for processing said data for said graphics artefacts to take account of sidereal time and means for storing said data for access in generating said graphics display.

66. Apparatus as defined in claim 63, wherein said graphics display means includes means for displaying each said graphics artefact with an intensity corresponding to the magnitude of the celestial body represented thereby.

67. Apparatus as defined in claim 63, wherein said graphics display means serves to display each said graphics artefact as a single picture element.

68. Apparatus as defined in claim 63, wherein said graphics display means further includes means for displaying information about the celestial body represented by each said graphics artefact.

69. Apparatus as defined in claim 63, wherein said graphics display means further comprises means for displaying information about the operating system status.

70. Apparatus as defined in claim 63, further comprising means for changing the graphics display to represent fields of view of the telescope that are of different areas and, when a larger area is to be displayed, selecting a reduced set of graphics artefacts having a brightness over a predetermined threshold.

71. Apparatus as defined in claim 63, wherein said means for correlating the position of said telescope with the position of said graphics display comprises:
- means for inputting data for a reference celestial body in the field of view of said telescope into a data base to select data for a corresponding graphics display including a reference graphics artefact representing said reference celestial body; and
- means for establishing the respective positions of the telescope and said corresponding graphics display as said datum.

72. Apparatus defined in claim 71, wherein said means for correlating the position of said telescope with the position of said graphics display comprises means for positioning said reference celestial body substantially centered in the field of view of the telescope and for positioning said reference graphics artefact substantially centered in said graphics display.

73. Apparatus as defined in claim 63, wherein said means for correlating comprises:
- means for inputting data for a reference celestial body within the field of view of said telescope into a data base to select data for a corresponding graphics display including a reference graphics artefact representing said reference celestial body;
- means for displaying said graphics display superimposed upon said field of view of said telescope;
- means for moving said graphics display to align said reference celestial body with said reference graphics artefact; and
- means for establishing the positions of said telescope and said graphics display at such alignment as said datum.

74. Apparatus as defined in claim 73, wherein said means for moving said graphics display serves to superimpose said graphics display upon said field of view of said telescope in the eyepiece thereof.

75. Apparatus as defined in claim 73, further comprising means for converting said reference graphics artefact into a cross-hair when displacing the position of said telescope to align said image of said reference celestial body with said reference graphics artefact.

76. Apparatus as defined in claim 75, wherein said means for converting said reference graphics artefact is responsive to the selecting of a predetermined viewing angle for the graphics display that corresponds to that of the telescope.

77. Apparatus as defined in claim 73, including means for moving said graphics display so that said reference graphics artefact is superimposed upon said image of said reference celestial body.

78. Apparatus as defined in claim 77 further comprising means for converting said reference graphics artefact into a cross-hair when superimposing said reference graphics artefact upon said image of said reference celestial body.

79. Apparatus as defined in claim 78, further comprising means for superimposing said graphics display upon said field of view of said telescope in the eyepiece thereof.

80. Apparatus as defined in claim 78, wherein said means for converting said reference graphics artefact is responsive to the selecting of a predetermined viewing angle for the graphics display that corresponds to that of the telescope.

81. Apparatus as defined in claim 80, further comprising means for superimposing said graphics display upon said field of view of said telescope in the eyepiece thereof.

82. An optical assembly for use with a telescope having an eyepiece and having an operating system comprising a graphics display generator, said optical assembly comprising: a beam splitter; means for directing light from said telescope onto said beam splitter; a video display unit positioned so as to direct light onto said beam splitter; and an eyepiece for viewing light from said beam splitter, such that the display from said video display unit is superimposed upon the optical image from said telescope in said eyepiece.

83. An optical assembly as defined in claim 82, wherein said beam splitter comprises: a glass plate, the arrangement being such that light from said telescope is transmitted through said glass plate to said eyepiece and light from said video display unit is reflected from said plate toward said eyepiece.

84. An optical assembly as defined in claim 82, wherein said video display unit comprises a cathode ray tube.

85. An optical assembly as defined in claim 82, further comprising a filter movable into and out of the optical path between said video display unit and said beam splitter.

86. An optical assembly as defined in claim 82, further comprising a filter movable into and out of the optical path between said telescope and said beam splitter.

87. An optical assembly as defined in claim 82, further comprising a diaphragm between said video display unit and said beam splitter.

* * * * *